United States Patent [19]

Childs et al.

[11] Patent Number: 4,713,254
[45] Date of Patent: Dec. 15, 1987

[54] CASEIN-SOLUBLE PROTEIN COMPLEX

[75] Inventors: Ernest A. Childs; Rajagopalan Narasimhan, both of Green Bay, Wis.

[73] Assignee: Schreiber Foods, Inc., Green Bay, Wis.

[21] Appl. No.: 202,237

[22] Filed: Oct. 30, 1980

[51] Int. Cl.[4] ............ A23C 19/08; A23C 20/00; A23J 1/20
[52] U.S. Cl. .................. 426/582; 426/580; 426/657; 426/491; 530/360; 530/361; 530/365; 530/366
[58] Field of Search ............ 426/580, 582, 583, 657, 426/478, 36, 40, 491; 260/119, 120, 121, 122; 530/360, 361, 365, 366

[56] References Cited

U.S. PATENT DOCUMENTS

| | | | |
|---|---|---|---|
| 2,574,508 | 11/1951 | Strezynski | 426/478 X |
| 2,623,038 | 12/1952 | Scott | 260/120 |
| 2,665,989 | 1/1954 | Howard | 426/580 |
| 2,701,204 | 2/1955 | Strezynski | 426/36 |
| 2,712,999 | 7/1955 | STrezynski | 426/478 X |
| 2,750,374 | 6/1956 | Howard et al. | 426/580 X |
| 2,832,685 | 4/1958 | Scott | 426/580 X |
| 3,018,280 | 1/1962 | Salzberg et al. | 260/119 |
| 3,218,173 | 11/1965 | Loewonstein | 426/580 X |
| 3,316,098 | 4/1967 | Noznick et al. | 426/582 X |
| 3,361,567 | 1/1968 | Engel et al. | 426/580 X |
| 3,535,304 | 10/1970 | Muller et al. | 426/580 X |
| 4,066,800 | 1/1978 | Rosenau et al. | 426/582 |
| 4,105,803 | 8/1978 | Perg | 426/582 |
| 4,519,945 | 5/1985 | Ottenhof | 426/657 X |

FOREIGN PATENT DOCUMENTS 403065 3/1968 Australia .
851129 9/1970 Canada .

OTHER PUBLICATIONS

Southward et al., Co-Precipitates and Their Application in Food Products, New Zealand Journal of Dairy Science and Techno., vol. 13, 1978, (pp. 77–96).
Mann, E. J., Co-precipitates, Dairy Industries, Aug. 1971, (pp. 470–471).
Thomas, M. A., Use of Calcium Co-precipitates in Processed Cheese, The Australian Journal of Dairy Technology, 1970, (pp. 23–25).
Rosenau et al., Production of Cheddar-Like Cheese via Nonfermentative pH Manipulation, J. of Food Science, vol. 40, 1975, (pp. 890–891).

Primary Examiner—David M. Naff
Attorney, Agent, or Firm—Willian Bricks Olds Hofer Gilson & Lione Ltd.

[57] ABSTRACT

A casein-soluble protein complex is prepared by raising the pH of an aqueous medium containing casein and soluble protein to within the range of 7.0 to 8.0, heating to a temperature in the range of about 65.6° C. to 85.0° C. and holding for a time sufficient to form the complex. Precipitation of the complex is then carried out by adjusting the temperature to within the range of 32.2° C. to 76.7° C. and lower the pH to within the range of 4.2 to 5.5 whereby the complex precipitates. The resultant precipitated complex is unique and can be used in making processed and imitation cheeses.

109 Claims, 3 Drawing Figures

CASEIN-SOLUBLE PROTEIN COMPLEX

FIELD OF THE INVENTION

This invention relates to processes and apparatus for recovering casein and soluble proteins from an aqueous medium, the products obtained from such processes, and the food made from the recovered products. Certain embodiments of this invention relate to processes for recovering casein and soluble proteins from milk, the product obtained from these recovery processes, and the food made from the recovered casein and soluble proteins.

BACKGROUND OF THE INVENTION

A. Definitions of Terms

"Milk" means the lacteal secretion obtained by the milking of one or more females of a mammalian species, such as cow, sheep, goat, water buffalo, or camel. Broadly speaking, such milk is comprised of casein (a phospho-protein) and soluble proteins, lactose, minerals, butterfat (milkfat), and water. The amount of these constituents in the milk may be adjusted by the addition of, or the removal of all or a portion of, any of these constituents. The milk may be homogenized. The term "milk" includes any milk and milk whose content has been adjusted.

Milk obtained by milking one or more cows is referred to as "cow's milk". Cow's milk, whose composition has not been adjusted is referred to herein as "whole milk". It is comprised of casein, whey proteins, lactose, minerals, butterfat (milkfat), and water. As used herein the term "whey proteins" means cow's milk proteins that do not precipitate in conventional cheese making processes. The primary whey proteins are lactalbumins and lactoglobulins. Other whey proteins that are present in significantly smaller concentrations include euglobulin, pseudoglobulin, and immunoglobulins. Cow's milk can be homogenized.

The composition of "cow's milk" can be adjusted by the removal of a portion of or all of any of the constituents of whole milk, or by adding thereto additional amounts of such constituents. The term "skim milk" is applied to cow's milk from which sufficient milkfat has been removed to reduce its milkfat content to less than 0.5 percent by weight. The term "lowfat milk" is applied to cow's milk from which sufficient milkfat has been removed to reduce its milkfat content to the range from about 0.5 to about 2.0 percent by weight.

The additional constituents are generally added to cow's milk in the form of cream, concentrated milk, dry whole milk, skim milk, or nonfat dry milk. "Cream" means the liquid, separated from cow's milk, having a high butterfat content, generally from about 18 to 36 percent by weight. "Concentrated milk" is the liquid obtained by partial removal of water from whole milk. Generally, the milkfat (butterfat) content of concentrated milk is not less than 7.5 weight percent and the milk solids content is not less than 25.5 weight percent. "Dry whole milk" is whole milk having a reduced amount of water. It generally contains not more than 5 percent by weight of moisture on a milk solids not fat basis. "Nonfat dry milk" is the product obtained by the removal of water only from skim milk. Generally, its water content is not more than 5 weight percent and its milkfat content is not more than 1.5 weight percent.

Thus, the term "cow's milk" includes, among others, whole milk, lowfat milk, skim milk, and whole milk which has been homogenized or whose content has been adjusted.

In the conventional manufacture of cheese, milk is processed to form a coagulum, which is further processed to produce a semi-solid mass called "cheese curd" (or "curd") and a liquid (whey). The curd contains casein, a small amount of lactose, most of the butterfat, minerals, and water. The whey contains the whey proteins, most of the lactose, some of the butterfat, minerals, and water. The curd is worked (e.g., stirred) and/or combined with certain flavor and taste producing ingredients, and/or ripened using bacteria to produce different varieties of "natural cheese."

One or more varieties of curd or natural cheese can be comminuted and mixed with an emulsifying agent to form, with the aid of heat, a homogeneous plastic mass called "processed cheese". Examples of processed cheeses include: "process cheese", "process cheese food", "process cheese spread", and "process cheese product". The various types of processed cheeses are obtained depending on the processing conditions, the specific varieties of curds or natural cheeses used, and the additional ingredients added during the processing.

"Imitation cheese" is a food made in semblance of any natural cheese variety, processed cheese, or other foods made of natural or processed cheese, in which casein, caseinates, and/or safe and suitable nonmilk ingredients, such as vegetable proteins and vegetable oil, replace all or part of the nutritive milk components normally found in the food being simulated.

B. The Problems This Invention Addresses

Basically, this invention addresses two problems, one having a significant impact upon natural and processed cheeses and the other having significant potential impact upon imitation cheeses. Although the problems to which this invention is directed are related to different types of cheeses, as will be understood more clearly hereinafter, the invention has broad application and produces products useable in any type of food product. Moreover, the fact that this invention solves these two problems does not mean or imply that these are the only problems this invention has solved, as will be more apparent hereinafter.

1. Relating to Natural and Processed Cheeses

This problem will be explained by briefly considering the conventional methods for manufacturing natural and processed cheeses. The natural and processed cheeses are derived from coagulated milk proteins. There are two basic conventional methods for coagulating milk proteins in the manufacture of such cheeses: the acid method and the rennet method.

In the acid method of coagulating milk proteins, the pH of the whole or skim milk is lowered using mineral or organic acids or bacterial cultures to about 4.5—4.7 until a coagulum is formed. The coagulum is then cut, cooked, physically separated from the whey, washed with water, and worked to produce a cheese curd which can be used for making natural cheeses, such as cottage cheese and quark cheese.

The rennet method is used for example in the manufacture of cheddar-type cheeses, including stirred curd cheese. The process for manufacturing stirred curd cheese will be briefly described to illustrate the rennet method.

Whole milk is pasteurized by heating it to 71.6° C. (161° F.) for about 16 seconds. The temperature of the milk is adjusted to 31.1° C. (88° F.). While the milk is being thoroughly mixed, an active lactic starter in the amount of 1.0–2.0% by weight of the milk is added. After the starter has been in contact with the milk for 15–30 minutes a rennet extract in the amount of 90 ml per 1000 pounds (454 kg) of milk is added. The milk is then mixed with suitable agitation for about 5 minutes and left quiescent for 25 minutes. During that time the rennet coagulates the casein forming a semi-solid mass. The mass is cut, slowly and steadily stirred, and gradually heated at the rate of 2° F. (1.1° C.) per 5 minutes until it reaches a peak temperature of 37.8° C. (100° F.). The curd-whey mixture is held at the peak temperature for at least 45 minutes. Most of the whey is then drained. Once the separated whey is drained, the curd is stirred with the remaining whey for 10 minutes. The rest of the whey is then drained while the curd is vigorously stirred until the titrable acidity of the whey being removed rises to between 0.25 and 0.35%. Once the required acidity is attained, coarse cheese salt is spread over the stirred curd in the proportion of 2.5 pounds (1.135 kg) per 100 pounds (45.4 kg) of cheese curd. The salted curd is continuously stirred for 50 minutes to produce the stirred curd cheese, which can be used as a starting material in the manufacture of processed cheeses.

In both conventional methods for coagulating milk proteins for making natural and processed cheeses, essentially the only protein precipitated from the milk is casein. The whey proteins remain dissolved in the whey and are discharged as a by-product of the process. The whey proteins comprise about 14 to 24 weight percent of whole or skim milk's proteins and the nutritional value of the whey proteins are at least comparable to the nutritional value of casein. Accordingly, the loss of the whey proteins in the by-product of the cheese making process limits the potential yields of such processes. For example, for cheddar-type cheeses the yields have been empirically established by the Van Slyke formula to be:

$$Y = \frac{1.09(.93 \times F + C - 1)}{1 - W}$$

Where
F = weight percent butterfat in the whole milk
C = weight percent casein in the whole milk
W = weight percentage of water in cheese.
Y = cheese yield in pounds of cheese per 100 pounds of whole milk Under normal conditions about 10 pounds (4.54 kg) of stirred curd cheese is recovered from each 100 pounds (45.4 kg) of whole milk. It is evident that the yield is based entirely on the casein and butterfat content of the milk. Accordingly, the yields of cheese curd would be increased, if at least a portion of the whey proteins could be recovered with the casein without adversely affecting the cheese making properties of the resulting cheese curd. For example, if the whey protein were recovered with the casein, the overall curd yield would increase approximately 14 to 24 percent.

Specifically consider stirred curd cheese. Instead of recovering 10 pounds (4.54 kg) of stirred curd cheese from 100 pounds (45.4 kg) of whole milk, as much as 11.4 to 12.4 pounds (5.18 to 5.63 kg) of stirred curd cheese could be recovered.

Similarly, since the stirred curd cheese, other natural cheeses, and other cheese curds are used as starting materials in the manufacture of processed cheeses, the yield of processed cheese from a given quantity of milk would also be significantly increased, if even a portion of whey proteins were recovered with the cheese curd.

Thus, the recovery of even a portion of the whey proteins with the casein in cheese curds is of great commercial importance in the manufacture of natural and processed cheeses.

2. Relating to Imitation Cheeses

Most imitation cheeses use milk proteins as a nutritive component. These milk proteins are obtained from skim milk by the acid or rennet coagulating methods already discussed, which produce about 2.5 to 2.7 pounds (1.13–1.22 kg) of protein solids per 100 pounds (45.4 kg) of processed skim milk. Because of the price of cow's milk in the United States, at the present time it is cheaper for United States manufacturers of imitation cheeses to purchase these milk protein solids from foreign suppliers. Therefore, most, if not all, of the milk protein solids used in imitation cheeses made in the United States are obtained from foreign suppliers. This situation, of course, places United States manufacturers of imitation cheeses in a vulnerable position, because their ability to obtain these milk protein solids is affected by world events and decisions of foreign governments.

One of the reasons why it is not economical to make milk protein solids for imitation cheeses in the United States is that these acid and rennet milk coagulating processes do not yield enough milk protein solids (in view of the price of cow's milk in the United States) to be competitive with the price of these milk protein solids from foreign suppliers. The significant limitation of these coagulating processes, as previously described, is that casein is essentially the only protein precipitated from the skim milk. Thus a process of treating skim milk which would recover at least a portion of the whey protein with the casein would reduce the competitive disadvantage that presently exists.

For example, if 50% of the whey proteins were recovered with the casein, the yield of milk protein solids would be increased to about 3.0 pounds (1.36 kg) per 100 pounds (45.4 kg) of processed skim milk, approximately a 15% increase in the amount of milk protein solids recovered. This would permit the price of the milk protein solids made from United States milk to be reduced about 15% and therefore be more competitive with the prices offered by foreign suppliers. Obviously, the more whey proteins recovered, the more the price of the recovered milk protein solids may be reduced and the more competitive protein milk solids manufactured in the United States would become.

Accordingly, the recovery of even a portion of the whey protein with the casein is of significant commercial importance in the manufacture of imitation cheeses also.

C. Prior Attempts to Recover Whey Proteins

For the above-stated reasons, efforts have been made to recover whey proteins and to utilize them in cheese making.

One approach for recovering whey proteins with the casein in making cheese curds and cheese is the ultrafiltration process. Briefly, milk is contacted with a membrane. The membrane permits the passage of water, most of the lactose, and some minerals. It prevents the passage of the proteins, casein, butterfat, and some minerals. Thus, a selective concentration ensues. Depending upon the nature of the cheese sought, the protein of the milk is concentrated two to six fold. The retentate (concentrate) is then coagulated by acid or rennet to form a curd which physically entraps the whey proteins. The curd is worked to make natural cheese. The problem with this approach is that the economic advantage of obtaining high yields is to a large extent dissipated in some cheese varieties as the result of the high costs of ultrafiltration. Accordingly, only a few manufacturers in the world are presently using the ultrafiltration method to make cheese curd or cheese.

Another approach is to recover whey proteins from the whey by drying, condensing, ultrafiltration, or reverse osmosis of the whey. The recovered whey proteins are then recombined with the cheese. Such processes are described for example in F. V. Kosikowski, *Cheese and Fermented Foods*, Edwards Brothers, Inc., Ann Arbor, Mich., 2 ed. 1977, pp. 451–458.

A problem with this approach is that some countries have laws which prohibit, for most types of natural cheeses, recombining separately recovered whey proteins with the curd. For example, in the United States whey proteins can be reincorporated into cheese curd only in the making of certain natural cheeses, such as skim milk cheese.

An additional problem associated with this approach is that the recovered whey constituents lack the physical and chemical characteristics required for the making of natural cheese. For example, the dried whey proteins can be sprinkled into the cheese curd. However, only a limited amount of whey proteins can be added to cheese curd in this manner without changing its desired properties. Accordingly, the whey proteins recovered from whey are not used to any significant extent in commercial processes for making natural cheese.

For these same reasons whey proteins recovered in this manner are not used to any significant extent in the commercial manufacture of process cheeses. Moreover, only limited amounts of such recovered whey proteins can be added to process cheese spreads, process cheese foods, process cheese products, or imitation cheeses, because the added proteins can adversely affect the body and texture of these products.

A further approach for recovering whey proteins is to co-precipitate them with the casein. One process for obtaining co-precipitates of casein and whey proteins from milk is disclosed in U.S. Pat. No. 3,535,304 and in the corresponding Australian Patent No. 403,065 (hereinafter referred to as the Muller patents). In the Muller process skim milk is heated to at least 75° C. (167° F.) to cause interaction of the milk proteins. The heated milk is then held for a sufficient time period to allow the desired degree of interaction between the casein and beta-lactoglobulin to occur. Generally the holding period is from one-half to thirty minutes. Then an acid, calcium chloride or mixture thereof, is added to lower the pH of the milk to between 4.2 and 5.5 and the milk is held until a co-precipitate is formed. The co-precipitate is then separated from the whey by a screen or another separating means. The Muller patents specify that the product resulting from this process should find acceptance in some forms of baby food, ice cream, coffee whiteners, small goods, biscuits, bread, breakfast cereals, and canned processed foods. The final product of the Muller process lacks the "functionality" for making processed and imitation cheeses, i.e., it does not have the functional characteristics that are required for making such cheeses.

Other known processes for the production of co-precipitates of casein and whey proteins also result in products that, although useful for some applications, cannot be used as starting materials for making cheese. For example, U.S. Pat. No. 2,623,038 (Scott) discloses a process wherein an alkali is added to skim milk to reduce the milk's titrable acidity, measured as lactic acid, to 0.04–0.14% which is not greater than about 6.75 pH. The alkali is added to inhibit precipitation during the subsequent heating step in which the skim milk is heated to a temperature of 180° F. to 212° F. (82.2° C.–100° C.). Once the desired temperature is reached, sufficient acid is added to precipitate casein and lactalbumin. The resulting precipitate is washed with hot water and drained to produce a solid mass having a solids content of between 25 and 50 weight-percent. The patentee specifies that the final product can be used as a protein supplement, i.e., a food additive. The protein supplement can be in the form of a precipitate or it can be dried. It can be mixed with yeast, vitamins, and flavoring materials. Like the product of the Muller process, the final product of the Scott process is not useful for making processed and imitation cheeses, because the product lacks the functionality required for making such cheeses.

Thus, the processes of the prior art have been unsuccessful in economically producing curds of casein and whey proteins that would be useful in the manufacture of processed and imitation cheeses. There is therefore an unsatisfied, long-felt need for a high-yield, controllable process for economically recovering from milk a curd of casein and whey proteins which can be used as a starting material in the manufacture of processed and imitation cheeses. In addition, it would be desirable to recover curds which include casein and other soluble proteins (besides whey proteins) that may be dissolved in milk or in a casein-containing aqueous medium. As used herein the term "soluble proteins" means the whey proteins and other proteins dissolved in an aqueous medium that generally would not precipitate when subjected to the conventional processes for making cheese curd.

OBJECTS OF THE INVENTION

An object of the present invention is to provide a process for recovering a curd of casein and soluble proteins from an aqueous medium.

Another object is to provide a process for recovering a curd of casein and soluble proteins from an aqueous medium in which the properties of the curd may be controlled to obtain the curd properties desirable for making processed and imitation cheeses.

A further object is to provide a process for treating an aqueous medium of casein and soluble proteins to form a precipitatable casein-soluble protein complex.

A still further object is to provide a process that permits the control of functional properties and the moisture content of curd made by precipitating a casein-soluble protein complex.

Still another object is to provide a unique casein-soluble protein complex, a precipitate of said complex, a curd containing said precipitate, and natural, processed, and imitation cheeses made from said curd.

Another object is to provide a high-yield, controllable process for economically recovering from milk a curd of casein and soluble proteins which can be used as a starting material in the manufacture of processed and imitation cheeses.

A further object is to provide a process for recovering casein and soluble proteins from an aqueous medium to produce a curd which can be used to replace conventional sources of protein (such as casein and caseinates) in the manufacture of imitation cheeses.

Still another object is to provide apparatus for recovering a curd of casein and soluble proteins from an aqueous medium.

Other objects of this invention will become apparent to those skilled in the art upon studying this specification and the appended claims.

SUMMARY OF THE INVENTION

This invention provides a process and apparatus for the recovery of casein and soluble proteins from an aqueous medium. The process permits the control of the functionality and the moisture content of the curds obtained thereby and produces curds that can be used for the making of processed and imitation cheeses.

The process of the present invention comprises these phases: (1) forming a casein-soluble protein complex; (2) precipitating the complex; and (3) recovering the casein-soluble protein complex precipitate from the liquid to form a curd that includes casein-soluble proteins complex precipitate, lactose, butterfat, minerals, and moisture. In the forming phase, the pH of the aqueous medium is raised to the range of about 7.0 to 8.0. The aqueous medium is then heated to a temperature in the range of about 65.6° C. to 85.0° C. (150° F.–185° F.) and held for a time period sufficient to permit the formation of casein-soluble protein complex. The medium is then ready for the precipitation phase.

In the precipitation phase the temperature of the medium is adjusted to the range of about 32.2° C. to 76.7° C. (90° F.–170° F.) and its pH is lowered to the range of about 4.2 to 5.5. This combination of temperature and pH causes the precipitation of the casein-soluble protein complex and determines the characteristics of the subsequently recovered curd.

In the recovery phase, the precipitate is separated from the liquid by centrifuging, filtering, or any other suitable method. The resulting curd can be used to manufacture processed and imitation cheeses.

The process of the present invention produces unique products. Specifically the forming phase of the process results in a unique intermediate product, i.e., a complex comprising casein combined with soluble proteins. The precipitation phase produces a unique casein and soluble-protein complex precipitate. The recovery phase yields a curd, containing the complex precipitate, that can be processed using conventional methods to make processed and imitation cheeses.

When cow's milk is used, the casein-soluble protein complex and the complex precipitate comprise proteins having about the following molecular weights measured in Daltons by the Gainer method: 68,600; 62,900; 24,900; 23,500; 20,100 and 19,000. The curd includes the complex precipitate, lactose, butterfat, and moisture, and preferably has a solids content greater than about 20 weight percent.

The processed and imitation cheeses made of the preferred curds of the present invention are further characterized by having melt numbers above about 4 as determined by the standard L. D. Schreiber test.

DETAILED DESCRIPTION OF THE INVENTION

A. General Description of the Process

Figure 1:
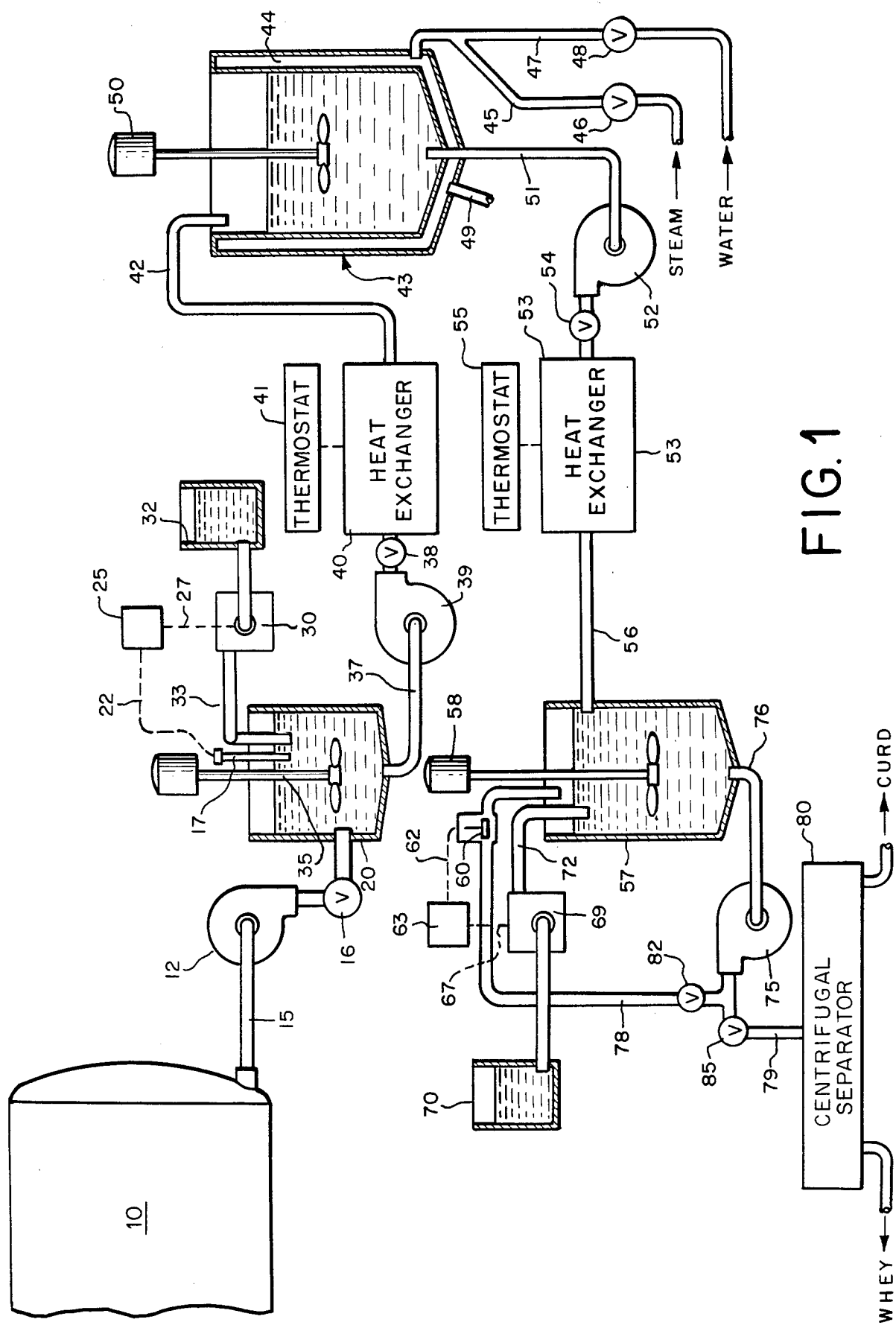
FIG. 1 is a schematic diagram of a continuous process apparatus of this invention.

The process and apparatus of the present invention simultaneously recovers casein and soluble proteins present in an aqueous medium and yields curds that can be used for making processed and imitation cheeses. The process can be carried out on any aqueous mixture of casein and soluble proteins including: milk, cow's milk, whole milk, skim milk, and aqueous mixtures of casein and soluble proteins derived from the same or different sources. The process produces a unique casein-soluble protein complex, casein-soluble protein complex precipitate, casein-soluble protein curd, and natural, processed, and imitation cheeses made from such curd. The casein-soluble protein complex and precipitate are unique in that they include both casein and soluble proteins. However, after precipitation and separation from the whey, the precipitate produces a curd whose chemical and physical properties are equivalent to curds made from conventional methods for coagulating milk proteins. Like such conventional curds, the curd of the present invention has the functionality for making processed and imitation cheeses.

The process of the present invention can be subdivided into three phases: (1) forming a casein-soluble protein complex; (2) precipitating the complex; and (3) recovering the casein-soluble protein complex precipitate to form a curd that includes casein-soluble protein complex precipitate, lactose, butterfat, minerals, and water.

During the complex forming phase the milk is treated to modify the proteins present therein. This treatment causes the soluble proteins to combine with casein to form a unique casein-soluble protein complex which can be precipitated. Thus, the first phase modifies the proteins present in the medium so that they will precipitate when the pH and temperature of the medium are adjusted in accordance with the present invention. The complex forming phase comprises three distinct steps: increasing the pH of the medium to the range of about 7.0 to 8.0, heating the pH-adjusted medium to a temperature in the range of about 65.6° C. and 85.0° C. (150° F.–185° F.), and holding the heated medium for a time period sufficient to permit the casein and soluble proteins to form a casein-soluble protein complex, preferably in the range of about 15 to 60 minutes.

In the second phase the molecules are precipitated at temperature and pH conditions which produce a precipitate that can be readily separated from the whey and that has the desired hydrodynamic volume and functionality. The precipitating phase generally comprises two distinct steps: (1) adjusting the temperature of the aqueous medium to a range of about 32.2° C. to 76.7° C. (90° F. –170° F.); and (2) adjusting the pH of the aqueous medium to a range of about 4.2 to 5.5. In some instances the aqueous medium at the conclusion of the complex forming phase is already at the temperature desired in the precipitating phase. In that event, during the precipitating phase the temperature of the aqueous medium is maintained at the desired level.

In the recovery phase of the process the precipitate is separated from the whey using centrifugation, filtering, or any other suitable means, and a curd comprised of casein-soluble protein complex precipitate, lactose, butterfat, minerals, and water is recovered.

B. Raw Materials For The Process

The process of the present invention can be carried out on any aqueous medium that includes casein and soluble proteins. Suitable aqueous media are naturally occurring media whose composition has not been adjusted; naturally occurring media whose composition has been adjusted by the addition of, or the removal of all or a portion of, any of its constituents; media made by mixing water with casein and soluble proteins or by adding soluble proteins to casein-containing aqueous medium; and mixtures of any of these media. Specific examples of media that are useful as raw materials for the process of this invention include the following: milk, cow's milk, whole milk, skim milk, skim milk with egg white proteins, and skim milk with corn proteins.

The compositions and the manner in which various types of milks are obtained or adjusted have been previously described. The mixtures of casein and soluble proteins can be made as follows. Casein, in the form of a concentrate or powder, and soluble proteins, in a solution or in the form of a powder, are added to water and mixed until a uniform mixture is formed. The soluble proteins include, for example, whey proteins, egg white proteins, and soluble corn proteins. The specific soluble proteins vary depending on the source of the material from which they were derived or separated. For example, egg white proteins include ovalbumin, ovotransferrin, ovomucoid, ovoinhibitor, ficin inhibitor, lysozyme, ovomucin, ovoflavoprotein, ovomacroglobulin, and avidin. Ovalbumin, ovotransferrin, and ovomucoid constitute 54, 12, and 11 weight percent of egg white, respectively. The remaining proteins are present in much lower concentrations and are therefore of less interest. Corn proteins include albumins, globulins, zein, and glutelin.

The concentration of casein and soluble proteins in the aqueous medium does not appear too critical as long as the aqueous medium has a sufficiently low viscosity to allow processing in accordance with this invention. The relative proportions of casein to soluble proteins is preferably in the range of about 1:1 to 10:1 by weight.

Similarly, soluble proteins can be added to and mixed with milk, cow's milk, skim milk, or whole milk. The amount of soluble proteins added is not critical as long as the aqueous medium has a sufficiently low viscosity to allow processing in accordance with this invention. The relative proportions of casein to soluble proteins, including whey proteins, in such media is not critical. Preferably the soluble proteins do not constitute more than 50% by weight of the total protein content of the medium.

DESCRIPTION OF AN EMBODIMENT OF THE PRESENT INVENTION

The process and products of the present invention will now be described in connection with the continuous process schematically shown in FIG. 1.

A. Forming The Casein-Whey Protein Complex

Referring now to FIG. 1, the raw material, in this instance skim milk, is pumped from a storage tank 10 by a centrifugal pump 12 via a line 15 into a tank 20. A valve 16 is used to control the flow rate through the line 15. A pH probe 17 immersed in the skim milk in the tank 20 measures the pH of the milk and transmits an electrical signal via a conductor 22 to a pH analyzer 25 which generates a signal that is transmitted via a conductor 27 to a metering pump 30. In response to the signal from the pH analyzer 25, the metering pump 30 introduces, via a line 33, an alkaline agent from a vessel 32 into the milk in the tank 20. To promote the distribution of the alkaline agent throughout the milk in the tank 20, the milk is continuously stirred by a motor-driven stirrer 35. The selection of a suitable stirrer is a matter of choice within the ordinary skill of one in the art. An example of a suitable mixer is a Model ND2 Lightnin mixer manufactured by Mixing Equipment Co., Inc. of Rochester, N.Y.

In this manner, the pH of the skim milk is adjusted to within the range of about 7.0 to about 8.0 and preferably between about 7.2 and about 7.5. If the pH of the skim milk during the conditioning phase is below about 7.0, the functionality of the curd obtained from the process rapidly becomes unacceptable for making processed and imitation cheeses. If the pH of the skim milk during the forming phase is above about 7.5, the curd obtained by the process begins to have off flavors which become unacceptable at a pH of about 8.0.

Any nontoxic, food grade, alkaline agent can be used for the adjustment of the pH in the tank 20. Examples of suitable alkaline agents include: magnesium oxide, calcium oxide, sodium hydroxide, potassium hydroxide, and calcium hydroxide. The use of sodium hydroxide is presently preferred, because it is inexpensive and readily available. The alkaline agent can be introduced in solid form or in a solution. It is preferred to introduce it in an aqueous solution, because the solution is easier to meter and mixes quicker and more uniformly with the skim milk.

The alkaline agent is metered by an automatic pH-adjustment system which controls the introduction of the alkaline agent into the tank 20. The selection of the particular equipment to insure proper pH adjustment in accordance with the parameters of the present invention is a matter of choice within the ordinary skill of one in the art. An example of a suitable pH analyzer is the A-73-1-1-0-0 Analyzer manufactured by Great Lakes Instruments, Inc., 885 North 55th Street, Milwaukee, Wis. 53223. A suitable pump is a metering pump identified as Catalog No. 754500, sold by Cole-Parmer Instrument Company of Chicago, Ill. It should be noted that in some applications it may be desirable to eliminate the automatic pH-adjustment system and allow the operator to monitor the pH and to manually adjust it to the desired level.

From the tank 20, the skim milk is pumped via a line 37 by a pump 39 into a heat exchanger 40. The flow rate through the line 37 is controlled by a valve 38. In the heat exchanger 40 the temperature of skim milk is raised to the range of about 65.6° C. to 85.0° C. (150° F.–185° F.), preferably in the range of about 71.1° C. to 79.4° C. (160° F.–175° F.). At temperatures in excess of about 79.4° C. (175° F.), the curd made by the process begins losing its functionality for making processed and imitation cheeses, leading to poor functionality in excess of about 85.0° C. (185° F.). At temperatures below about 65.6° C. (150° F.), the required combination of casein and soluble proteins does not occur to an appreciable degree. The most preferred range of temperatures is between about 71.1° C. (160° F.) and 75.0° C. (167° F.). The most preferred temperatures produce the highest yields and result in curds having excellent functionality for making processed and imitation cheeses. The temperature in the heat exchanger 40 is automatically controlled by a thermostat 41.

The milk can be heated to the desired temperature by any direct or indirect heating means. The selection of the particular heating and control means to achieve the heating requirements of the process of the present invention is a matter of choice within the ordinary skill of one in the art. At the present time indirect heating by a swept surface heat exchanger, such as, the Contherm Scraped-Surface Heat Exchanger sold by The De Laval Separator Company of Newburyport, Mass. 01950, is preferred.

The heated milk is pumped via a line 42 from the heat exchanger 40 into a jacketed holding tank 43 where it is held for a time period sufficient to permit the formation of the casein-whey protein complex. Generally, the time period is in the range of about 15 to 60 minutes. Preferably, the milk is held for a time period in the range of about 15 to 30 minutes. The temperature in the tank 43 is maintained at the desired level by passing through the jacket 44 either cold process water or steam. The steam is supplied via a line 45 controlled by a valve 46. The cold process water is supplied via a line 47 controlled by a valve 48. The steam or cold process water exits from the jacket 44 via a line 49. The temperature in the tank 43 is generally maintained at the set point temperature of the thermostat 41. It is preferred to stir the milk in the holding tank 43 using an appropriate stirrer, such as a motor-driven stirrer 50. The selection of a suitable stirrer is a matter of choice within the ordinary skill of one in the art.

In the holding tank 43 a casein-whey protein complex is formed and is colloidally suspended in the skim milk. The precise bonding between the casein and whey proteins in the complex is not fully understood. At the present time it is theorized that the casein and whey proteins are covalently bonded. However, applicants do not want to be limited to the theory, since it has no been scientifically established to their satisfaction as yet. Thus the term "complex" as used herein is not intended to have any definitive scientific meaning, but instead is used generically to embrace whatever bonding mechanism exists between the casein and soluble proteins as a result of performing the process of this invention.

B. Precipitating The Complex

From the holding tank 43, the milk containing the casein-whey protein complex is pumped via a line 51 by a pump 52 to a heat exchanger 53. The flow rate through the line 51 is controlled by a valve 54. In the heat exchanger 53 the skim milk is cooled to within the range of about 32.2° C. to 76.7° C. (90° F.–170° F.), preferably between about 48.9° C. and 65.6° C. (120° F.–150° F.). The temperature of the skim milk in the heat exchanger 53 is controlled by a thermostat 55. In the alternative, the temperature of milk leaving the heat exchanger 53 can be checked by the operator who can manually adjust it. The temperature adjustment can be made using any suitable heat exchanger such as The De Laval Scraped-Surface Heat Exchanger mentioned above. The selection of a particular heat exchanger and control means to achieve the heat transfer requirements of the process of the present invention is a matter of choice within the ordinary skill of one in the art.

The milk from the heat exchanger 53 is pumped via a line 56 by the pump 52 into a precipitation tank 57. A pH probe 60 continuously measures the pH of the milk in the tank 57 and generates a signal which is transmitted via a conductor 62 to a pH analyzer 63 which generates a control signal that is transmitted via a conductor 67 to a metering pump 69. The metering pump 69 controls the introduction of acidulant from an acidulant vessel 70 via a line 72 into the tank 57. The selection of the pH adjusting and control means to achieve the pH adjustment required in the process of this invention is a matter of choice within the ordinary skill of one in the art. An example of a suitable pH adjusting and control means is model A73-1-1-0-0 pH Analyzer and the Cole-Parmer pump specified above.

The content of the tank 57 is continuously and vigorously agitated by a stirrer 58. The selection of a stirrer is a matter of choice within the ordinary skill of one in the art. An example of a suitable stirrer is a Cleaver Brooks Model 30-P-1-V-5 mixer. The mixing of the content of the tank 57 is further promoted by partial recirculation thereof by a pump 75 via a line 76 and a recirculation line 78. In order to avoid the effects of turbulence on pH measurements, the pH probe 60 is preferably located in the recirculation line 78.

The milk in the tank 57 is maintained at a pH in the range of about 4.2 to 5.5, preferably between about 4.6 and 5.2. Any food grade acidulant or acid producing culture can be used to lower the pH of the milk in the tank 57. Examples of suitable acidulants include: hydrochloric, phosphoric, sulfuric, acetic, citric, lactic, hydroxyacetic, tartaric, and D-Glutonodelta-lactone. Presently preferred is hydrochloric acid. The lowering of the pH of milk causes the casein-soluble protein complex to precipitate and form a low viscosity slurry in the tank 57. The particles of the complex precipitate are generally in the range from about 80 to 325 mesh (U.S. Sieve Series).

C. Recovering the Curd from the Whey

The slurry with the casein-whey protein complex precipitate is pumped from the tank 57 via a line 76 by the pump 75. A part of the flow, generally about 25 to 50 percent by volume, is recirculated via the line 78. The remainder of the flow is pumped via a line 79 into the separator 80. The flow rates through lines 78 and 79 are controlled by valves 82 and 85, respectively. In the separator 80 the precipitate is separated from the whey to produce a curd.

Any separator suitable for separating precipitates from liquids can be used, including, for example, centrifugal separators, filters, and filter presses. The selection of a suitable separator is within the ordinary skill of one in the art. However, the use of centrifugal separators is preferred, because they are believed to promote agglomeration of the curd and provide an efficient and economical separation. The particles are agglomerated by the action of the centrifugal separator so that the particle diameter of the particles in the curd is 10 to 100 times higher than that of particles of the complex precipitate in the tank 57. An example of a preferred separator is the 6" Bird Continuous Solid Bowl Centrifugal manufactured by Bird Machine Co., Inc. of South Walpole, Mass. and described in their Bulletin LBC-102.

This is a solid bowl, helical conveyor decanting centrifuge.

D. Example of a Continuous Process

This example illustrates the manner in which the process of the present invention can be conducted in a continuous system and is not intended to limit the scope of the present invention in any manner.

The system utilized in this experiment was similar to that shown in FIG. 1, except that the pH in the tank 20 was measured by a pH probe and then manually adjusted. Instead of thermostats 41 and 55 thermistors were used to determine the temperatures in the line 42 and in the tank 57, respectively. The temperature readings were then used by the operator to adjust steam or process water inputs into the heat exchangers 40 and 53. Accordingly, in discussing this experiment references will be made to the system of FIG. 1.

Approximately 200 gallons (757 liters) of skim milk was manually poured into a 300 gallon (1135.5 liters) tank 20. In the tank 20 the milk was agitated using a conventional Model ND2 Lightnin mixer 35 manufactured by Mixing Equipment Company, Inc. of Rochester, N.Y. The pH in the tank 20 was then adjusted to 7.5 by manually pouring into the tank a 25 weight percent aqueous solution of sodium hydroxide.

From the tank 20 the pH-adjusted milk was pumped via the line 37 by a 1.5 horsepower (1.521 horsepower, metric) centrifugal pump 39 into a swept surface heat exchanger 40 (Model 6×9 Contherm Scraped-Surface Heat Exchanger manufactured by DeLaval Separator Company of Newburryport, Mass.). In the heat exchanger 40 the temperature of the milk was brought to 75° C. (167° F.) and was maintained at that level by manually controlling steam and process water inputs into the heat exchanger 40.

From the heat exchanger 40 the heated milk was pumped into a 150 gallon (567.8 liters) jacketed holding tank 43 via the line 42. In the tank the milk was agitated using a conventional mixer 50. The temperature in the holding tank 43 was maintained at 75° C. (167° F.) by manually introducing steam or process water into the jacket 44 via lines 45 and 47, respectively. The flow of steam was controlled by the valve 46 and the flow of process water was controlled by the valve 48.

From the holding tank 43 the milk was pumped by a TEFC 2 horsepower centrifugal pump 52 manufactured by Lincoln Electric Company of Cleveland, Ohio via line 51 into a swept surface heat exchanger 53 (Model 6×9 Contherm Scraped-Surface Heat Exchanger manufactured by DeLaval Separator Co.). In the heat exchanger 53 the temperature of the milk was lowered to 53.9° C. (129° F.). The temperature was monitored by a conventional model 5820 Digitec thermometer and the operation of the heat exchanger 53 was manually adjusted to maintain the temperature of the milk at 53.9° C. (129° F.).

From the heat exchanger 53 the milk was pumped by the centrifugal pump 52 into the tank 57 and there it was agitated using a Cleaver Brooks Model No. 30-P-1-V-5 mixer 58. 5.8 N hydrochloric acid was pumped from the tank 70 via line 72 by the metering pump 69 (identified as Catalog No. 754500 of Cole-Palmer Instrument Company of Chicago, Ill.). The amount of acid added was automatically controlled by the pH analyzer 63 (Model No. 73-1-1-0-0 manufactured by Great Lakes Instrument, Inc. of Milwaukee, Wis.). The pH in the tank 57 was maintained about 4.74 throughout the run. The milk in the tank 57 was thoroughly and vigorously agitated using a Cleaver Books Model 30-P-1-V-5 mixer 58. The pH adjustment in the tank 57 caused the milk to precipitate, forming a low viscosity slurry.

From the tank 57 the milk slurry was pumped by a 2 horsepower centrifugal pump 75 manufactured by Reliance Electric Company into a centrifugal separator 80 and a part thereof was recirculated via line 78 into the tank 57. The separator 80 was a 6-inch diameter, solid bowl, helical conveyor decanting centrifuge manufactured by Bird Machine Company, Inc. of South Walpole, Mass. The separator 80 was operated at 4000 rpm at the lowest of the three pool depth settings. The slurry was separated by the separator 80 into a curd and whey.

Throughout the run the flow rates of milk were maintained at about 4 gallons/minute (15.14 liters/minute) by adjusting valves 38, 54 and 85. The flow through the recirculation line 78 was kept at 1 gallon/minute (3.785 liters/minute) using the valve 82.

The whey was analyzed by the standard Association of Official Agricultural Chemists (AOAC) MicroKjeldahl method for nitrogen and the amount of protein present in the whey was calculated. Of the original 47.84 pounds of proteins present in the skim milk, only 2.28 pounds was in the whey. Thus, 95.23 weight percent of all proteins present in the skim milk was recovered in the curd.

The curd was then used to make processed cheese and the curd was found to possess the functional properties required for cheese making. The resulting processed cheese had a satisfactory organoleptic quality.

DESCRIPTION OF ANOTHER EMBODIMENT OF THE PRESENT INVENTION

A. General Description of an Embodiment of a Batch Process

The process of the present invention can also be carried out in a batch system. The process steps are performed in the manner described in connection with the continuous system except that the steps of the first two phases are carried out in a jacketed tank. The same acidulant and alkalating agents are also used. The equipment for the batch process of the present invention is schematically depicted in FIG. 2.

Figure 2:
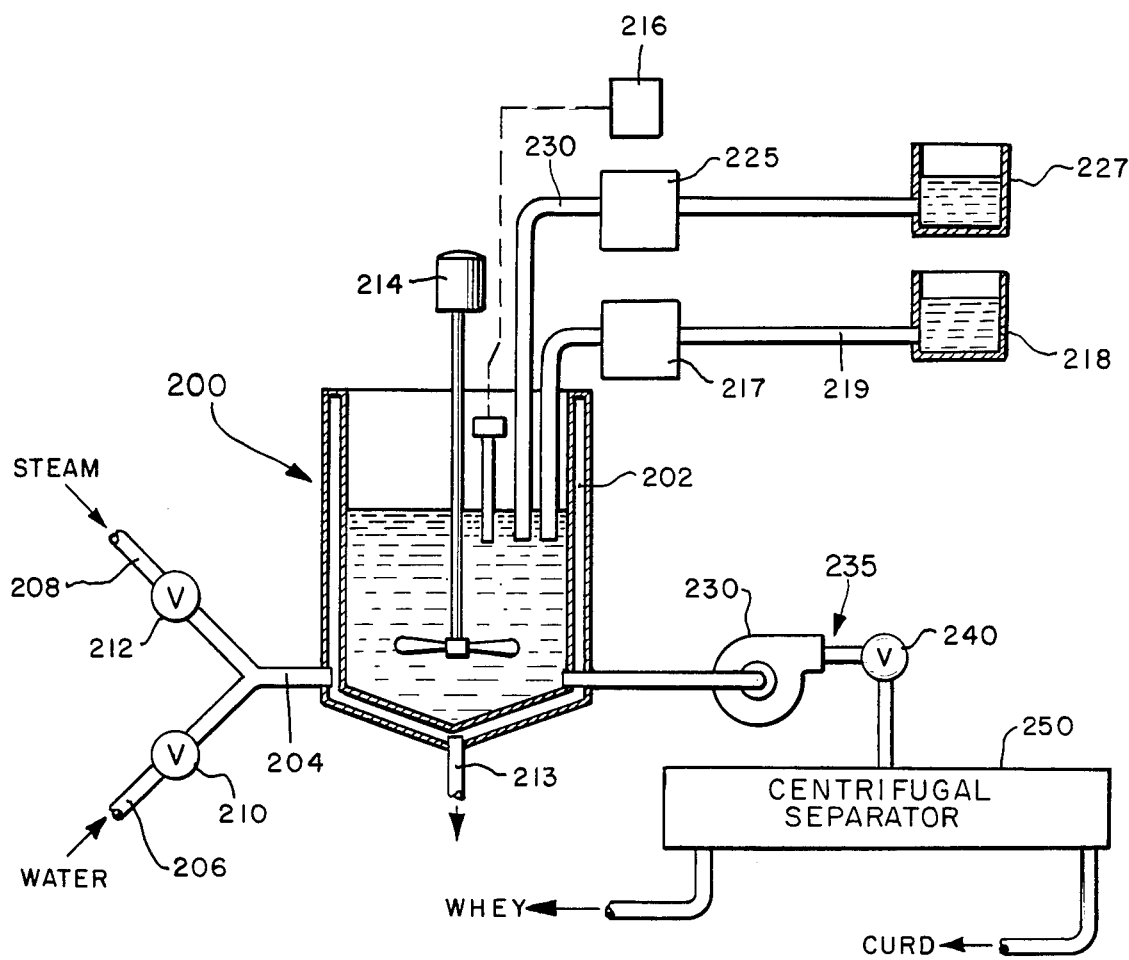
FIG. 2 is a schematic diagram of a batch process apparatus of this invention.

Referring now to FIG. 2, a jacketed tank designated generally by a reference numeral 200 includes a jacket 202 which is connected via a line 204 to a supply of process water in a line 206 and steam in a line 208. Valves 210 and 212, respectively, control the flow of water and steam through the jacket 202. The steam or water exit from the jacket 202 via a line 213.

A conventional mixer 214 is used to stir the contents of the tank 200 and a pH-meter 216 measures the pH of the content of the tank 200. When the pH has to be adjusted upward, a metering pump 217 is turned on to pump alkaline agent, such as a sodium hydroxide solution, from a tank 218 via a line 219 into the tank 200. When the pH has to be lowered, a metering pump 225 is turned on to pump acidulant, such as hydrochloric acid, from the tank 227 via a line 230 into the tank 200. The choice of the mixer 214 and the pH meter 216 is within the ordinary skill of one in the art. An example of a suitable pH meter is Orion 601 A pH meter manufactured by Orion Research Incorporated of Cambridge, Mass.

Once the first two phases of the process are completed and a complex precipitate slurry is formed, a pump 230 pumps the slurry from the tank 200 via a line 235 into a centrifugal separator 250 which separates it into a curd and whey. The flow rate through the line 235 is controlled by a valve 240. The centrifugal separator is the same as the separator 80 of FIG. 1.

The curd obtained from the batch process has the same physical and chemical characteristics as the curd that obtained from the continuous process.

B. Example of a Batch Process

This example illustrates the manner in which the process of the present invention can be carried out in a batch system, and is not intended to limit the scope of the present invention in any manner.

The batch system used in this example is similar to that depicted in FIG. 2 except that alkaline agent and acidulant were added manually.

Approximately 150 gallons (567.8 liters) of skim milk were poured into a jacketed stainless steel tank 200. The initial temperature of the milk was 12.8° C. (55° F.). A sufficient amount of 25 weight percent aqueous solution of sodium hydroxide was then manually added to the skim milk to bring the pH thereof to 7.5. The pH-adjusted milk was then heated to 73.9° C. (165° F.) by passing steam via lines 208 and 204 into the tank's jacket 202. The heated milk was held at that temperature for 30 minutes, resulting in the formation of a casein-whey protein complex. The flow rate of steam was controlled by the valve 212 and the steam was removed via the line 213. After the 30-minute holding period the milk was cooled to 10° C. (50° F.) by passing process water through the jacket 202, thereby preserving it for further processing the following day. The pH adjustment, heating and cooling were carried out while the skim milk was being agitated by the conventional mixer 214.

Approximately 16 hours later the stored milk was agitated by the mixer 214 and heated to 54.4° C. (130° F.) by passing steam through the jacket 202 of the tank. A sufficient amount of 11.6 N hydrochloric acid was added to the tank 200 to bring the pH of the skim milk to 4.6. The lowering of the pH caused the precipitation of the casein-whey protein complex. The content of the tank 200 was then pumped via the line 235 by the centrifugal TEFC 2 horsepower centrifugal pump 230 manufactured by the Lincoln Electric Company of Cleveland, Ohio into the separator 250. A flow rate of 4 gallons per minute (15.14 liters/minute) was maintained by adjusting the valve 240. The separator 250 was a 6-inch diameter solid bowl, helical conveyor decanting centrifuge manufactured by Bird Machine Company, Inc. of South Walpole, Mass. The separator 250 was operated at 4000 rpm at the lowest of the three pool depth settings. The separator 250 separated the slurry into a curd and whey.

The curd, analyzed by the method described in F. V. Kosikowski, *Cheeses and Fermented Milk Foods*, Edwards Brothers, Inc., Ann Arbor, Mich., 2 ed. 1977, pp. 563-564, had a solids content of 24.2% by weight. The whey was analyzed using the standard AOAC Micro-Kjeldahl method to determine its protein content. From the results of this analysis it was determined that 94.3% by weight of the proteins in the skim milk was recovered in the curd.

The curd was stored for about 16 hours in a refrigerator and then used for making processed cheeses. Its functional characteristics were found to be satisfactory for making processed cheeses. The resulting processed cheeses had satisfactory organoleptic quality.

THE CURD OF CASEIN AND SOLUBLE PROTEIN

As a result of the process of the present invention, soluble proteins are precipitated with the casein and are recovered with the curd. Thus the whey produced in the process of the present invention will contain, at a maximum, only a small amount of the soluble proteins when compared to whey produced when milk has been treated in the conventional cheese making procedures previously discussed. The curd of the present invention is unique in that it exhibits physical and chemical characteristics similar to curds made in a conventional manner even though it includes soluble proteins. The specific properties of the curd and the unique complex precipitate made from cow's milk are as follows.

A. Physical and Chemical Properties of the Curd

Figure 3:
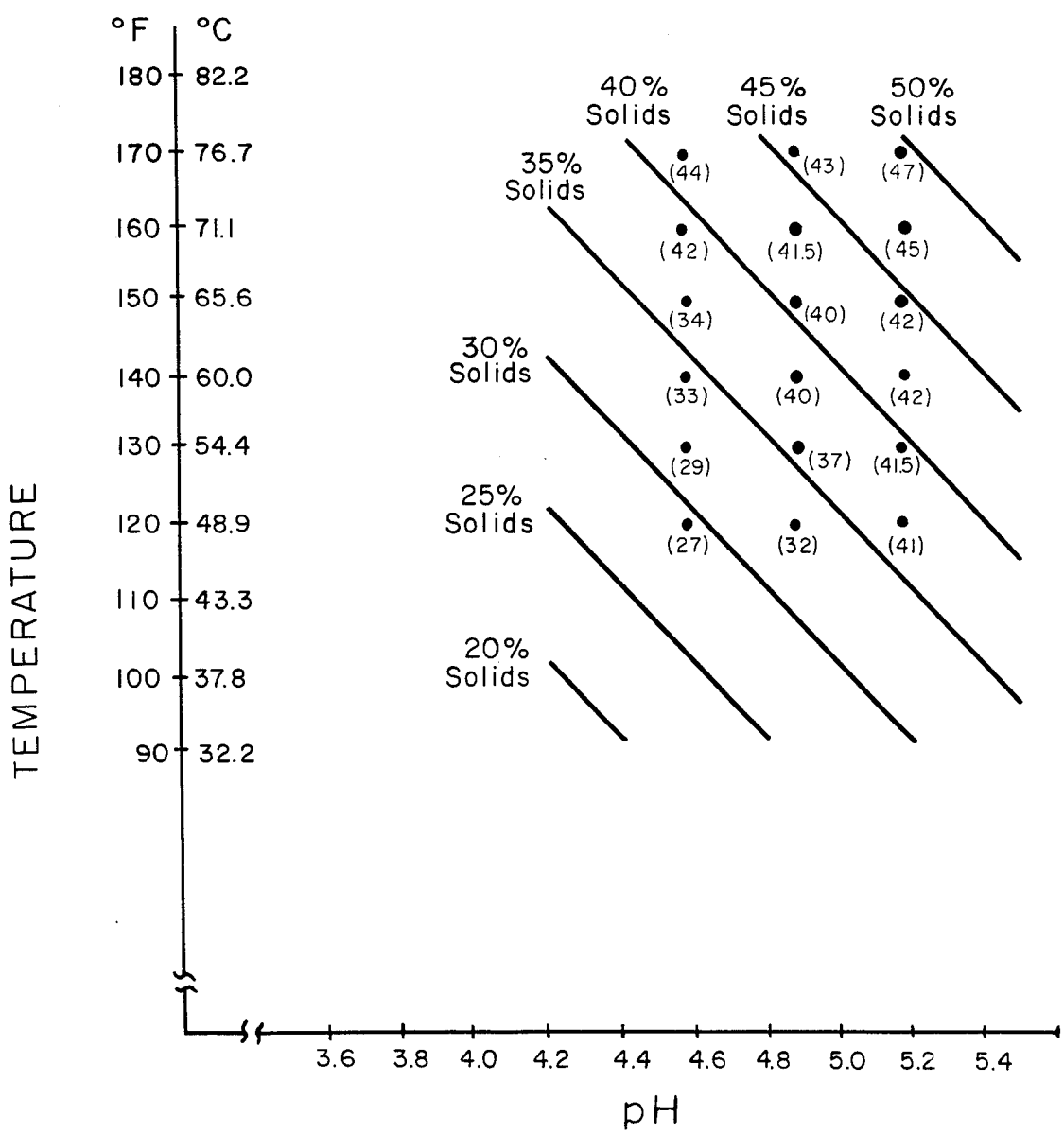
FIG. 3 is a graphical representation of the percentage of solids in a curd obtained by the process of the present invention as a function of the temperature and the pH in the precipitation phase.

The process of the present invention allows the control of the properties of the resulting curd. For example, several significant properties of the recovered curd are determined by the particular combination of temperature and pH selected in the precipitation phase. The effect of temperature and pH on the water content of the recovered curd is graphically illustrated in FIG. 3. Referring now to FIG. 3, the numbers in parentheses indicate the percent solids by weight in curds obtained by the process of this invention at pH's and temperatures defined by the points adjacent those numbers. The diagonal solid lines represent the locus of points for pH and temperatures that would produce a specified percent solids in the curd. It should be noted that the water content of the curd, on a percent by weight basis, can be obtained by subtracting the solids percentage from 100%. It is evident from the data of FIG. 3 that the process of the present invention permits a precise control of the water content of the curd and that the control is achieved by a proper selection of the temperature and the pH in the precipitation phase.

It has also been discovered that the consistency of the curd having a particular moisture level can be controlled by the process of this invention. Specifically, the selection of a high pH and a low temperature for a given percentage of solids will produce a curd that has a relatively low viscosity, i.e., a curd that is plastic. As the pH is lowered and the temperature is increased, the resulting curd's viscosity increases until it becomes granular. Consider for example the 40% line in FIG. 3. At a pH of about 5.5 and at a temperature of about 48.9° C. (120° F.), the resulting curd will have a low viscosity and its consistency would resemble that of a commercially manufactured mozzarella cheese. As the temperature and pH are adjusted moving up on the 40% solids line, the viscosity of the curds increases so that at a pH of about 4.8 and temperature of about 66° C. (150.8° F.), the curd becomes particulate and grainy, suitable for making stirred curd cheese for manufacturing. Curds having from about 35% to about 65% moisture are preferred for making most types of processed and imitation cheeses. Since many cheeses by law may not contain above a certain weight percentage of moisture the ability to obtain curds having low moisture levels, e.g., 50% moisture, is an important advantage of the present invention.

The solids in the curd made from cow's milk generally include on a weight basis about 38-94% protein (casein-soluble protein complex precipitate), 0-55% butterfat, 3-9% lactose, and 3-8% minerals. The specific percentages depend on the composition of the cow's milk and the processing conditions. If desired, the curd may be washed with water, acidic or basic solutions, brine, or the like while still within the centrifugal separator to alter the curd's lactose or ash contents, change its pH value, or add new ingredients.

The solids in the curd made from whole milk generally include on a weight basis about 23-69% caseinsoluble protein precipitate, 25-60% butterfat, 3-9% lactose and 3-8% minerals.

The solids in the curd made from skim milk generally include on a weight basis about 83-94% protein (casein-soluble protein complex precipitate), 3-9% lactose, and 3-8% minerals. The analysis of a specific curd made from skim milk in accordance with this invention yielded the following results:

| Component | Weight Percent |
| --- | --- |
| Moisture | 62.15 |
| Protein | 32.76 |
| Minerals (Ash) | 1.88 |
| Lactose | 2.26 |
| Others | 0.95 |

The moisture content was determined by the method described in detail in F. V. Kosikowski, *Cheese and Fermented Milk Foods*, Edwards Brothers, Inc., Ann Arbor, Michigan, 2 ed. 1977, pp. 563-564. The protein content was determined by the standard AOAC Micro-Kjeldahl method. The lactose content was determined by a standard method described for example in C. H. Acton, *The Determination Of Lactose In Cheese*, The Australian Journal of Dairy Technology, September, 1977. The mineral content was determined by the standard AOAC test method for ash.

The manner in which various constituents of curd are held together is not known. It is believed that lactose is dissolved in the moisture phase of the curd and the water solution is associated with the complex precipitate. The proportion of minerals present in the water solution is believed to be determined by the pH of the curd. The higher the pH, the more the minerals are directly associated with the complex precipitate. The lower the pH, the more they are associated with the water solution.

B. Molecular Composition of the Proteins in the Curd

Whey proteins are present in the curd in the form of a complex precipitate. The complex is first formed in the forming phase of the process. At that stage it is contained in the liquid medium in the form of a colloidial suspension. Subsequently, in the precipitation phase, the complex is precipitated to form the complex precipitate. The complex precipitate is recovered in the curd in the separation phase.

The analyses of the complex, the complex precipitate, and the complex precipitate in the curd show that in each the molecular distribution of proteins measured in Daltons by the Gainer Electrophoresis method is about: 68,600; 62,900; 24,900; 23,500; 20,100; and 19,000. The Gainer method is described in Gainer, *Micro Disc Electrophoresis in Sodium Dodecyl Sulfate: An Application to the Study of Protein Synthesis in Individual, Identified Neurons*, Analytical Biochemistry, 44, 589-605 (1971). A general discussion of electrophoresis can be found for example in Weber and Osborn, *Reliability of Molecular Weight Determinations by Dodecyl Sulfatepolyacrylamide Gel Electrophoresis*, Journal of Biological Chemistry, Vol. 244, No. 16, p. 4406 (August 1969), and Davis, *Disc Electrophoresis--II: Method and Application to Human Serum Proteins*, Annals of the New York Academy of Sciences, Vol. 121, Article 2, p. 404 (December 1964). To assure that accurate results are obtained by the Gainer method, proteins having known molecular weight at each end and near the middle of the expected spectrum of molecular weights should be tested to verify the correctness of the method used.

C. Primary Functional Characteristics of the Curd

The functional characteristics directly exhibited by the curd itself are the primary functional characteristics. The most important primary functional characteristic of the curd of this invention is that it has functionality for making processed and imitation cheeses. It is not known what physical and chemical properties determine functionality of a curd. It is now believed that a combination of the water holding capacity and the emulsifying capacity of the curd at processing conditions might determine whether processed and imitation cheeses can be made from such curd. The theory is that unless these properties are within narrowly defined ranges, the curd lacks the requisite functionality.

The water holding and emulsifying capacities of various curds which cannot be made into processed and imitation cheeses and the water holding and emulsifying capacities of curds made in accordance with the present invention were measured at room temperature. The assumption made that the water holding and the emulsifying capacity measurements would approximate the same properties at processing conditions. The results showed that the curds of the present invention indeed have water holding and emulsifying capacities different from those of the curds that lack functionality for making processed or imitation cheeses. Regardless of which factors determine the functionality of curd for making processed or imitation cheese, the fact is that the curds made in accordance with the process of the present invention possess the requisite functionality for manufacturing such cheeses.

D. Secondary Functional Characteristics of the Curd

The secondary functional properties of the curd are those that cannot be measured in curd itself, but which are measureable in the processed and imitation cheeses made therefrom.

Good melting characteristics are required for 80-90% of processed and imitation cheeses sold in most countries. Generally, the melting characteristics of processed and imitation cheeses are determined by the kind of natural cheese or curd from which it is made.

The melt values of the processed and imitation cheeses made from the curds and natural cheeses of this invention are above about 4 as determined by the standard L. D. Schreiber Test (described in detail in F. V. Kosikowski, *Cheese and Fermented Foods*, Edwards Brothers, Inc., Ann Arbor, Mich., 2 ed. 1977, pp. 404-406). It is well known that processed or imitation cheeses attaining a value of 4 or higher on the Schreiber test are commercially acceptable, whereas those with a melt value below 4 are generally unacceptable.

DESCRIPTION OF PROCESSES FOR MAKING PROCESSED CHEESES

A General Description

The curds obtained in accordance with the present invention can be used as starting materials for making various processed cheeses. These curds can also be converted into a natural cheese and then the natural cheese can be used as a starting material for making processed cheeses. Generally, curds made in accordance with the process of the present invention, or natural cheeses obtained from such curds, or mixtures thereof, are blended with an emulsifier and butterfat, if required. Optional ingredients, such as colors, salt, skim milk, whey, milk, cream, organic acids, gums, starches, buttermilk, dehydrated cream, preservatives, enzyme modified cheese, fruits, vegetables, and stabilizers can also be blended into the processed cheese.

The blending is accomplished in the presence of heat. Generally, the ingredients are heated to a temperature in the range of about 65.6° C. (150° F.) to 93.3° C. (200° F.) for about 0.5 to 10 minutes. The resulting homogeneous plastic mass is the processed cheese.

In many countries laws prescribe the permissible composition of various types of processed cheeses. For example, in the United States the processed cheeses are classified as pasteurized process cheese, pasteurized process cheese food, and pasteurized process cheese spread. Each of these must be made from specified varieties of natural cheese or natural cheeses. Accordingly, in the United States the curd of the present invention must be converted into a suitable natural cheese before being made into processed cheese.

"Process cheese product" has been recognized in the industry and standards for its manufacture have been proposed but not yet adopted in the United States.

To illustrate how the curd of the present invention can be made into processed cheese, the method for making each of the types of processed cheese recognized in the United States will be explained in detail. It should be emphasized that these methods are only examples and that alternative procedures for using the curd of the present invention to make processed cheese can also be used. For example, where not prohibited by law, processed cheese can be made directly from the curd of the present invention without converting it into a natural cheese.

At the present time, it is preferred to convert the curd of the present invention into stirred curd cheese or skim milk cheese for manufacturing. Stirred curd cheese is made from whole milk. The pH and temperature conditions during the precipitation phase must be selected to produce a curd which when salted will have not more than 39 percent by weight of moisture and whose solids contain no less than 50 percent milkfat. The resulting curd is stirred and salted to produce stirred curd cheese. Alternatively, the butterfat may be removed from the whole milk; the resulting skim milk treated in accordance with the present invention; and the butterfat recombined with the curd and salted to yield a mixture, which when stirred, produces a stirred curd cheese.

Skim milk is the raw material for making skim milk cheese for manufacturing. The pH and the temperature in the precipitation phase must be selected to produce a curd that contains not more than 50 percent moisture by weight. The resulting curd is stirred and salted to produce skim milk cheese for manufacturing.

In the ensuing description of the manufacture of various processed cheeses recognized in the United States, the stirred curd cheese and the skim milk cheese for manufacturing are used as examples of natural cheeses obtained from the curd of the present invention. It should be emphasized that it is possible to convert the curd of the present invention into other varieties of natural cheese, but the conversion of the curd into stirred curd cheese and the skim milk cheese for manufacturing is presently preferred.

B. Pasteurized Process Cheese

Pasteurized process cheese is prepared by comminuting and mixing, with the aid of heat, the stirred curd cheese made in accordance with this invention, alone or with one or more varieties of natural cheese, with an emulsifying agent into a homogeneous mass. During its preparation, pasteurized process cheese is heated for not less than 30 seconds at a temperature of not less than 65.6° C. (150° F.). The emulsifying agent is used in such quantity that the weight of the solids of the emulsifying agent is not more than 3 percent of the weight of the pasteurized process cheese.

Examples of suitable emulsifying agents include: monosodium phosphate, disodium phosphate, dipotasium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, and sodium potassium tartrate.

The following optional ingredients may be used: an acidifying agent in such quantity that the pH of the ensuing process cheese is not below a pH of 5.3, cream, anhydrous milkfat, dehydrated cream, water, salt, antimycotics, anti-sticking agents, harmless artificial coloring, spices, flavorings, and suitable enzyme modified cheese.

Suitable acidifying agents include, for example: vinegar, lactic acid, citric acid, acetic acid, and phosphoric acid.

The moisture and butterfat contents of the pasteurized process cheese generally corresponds to the legal limit of natural cheese. For example, in the process cheese made from stirred curd cheese the moisture content cannot be higher than 40 weight percent and it must have no less than 50 weight percent of butterfat on a dry basis.

C. Example of Pasteurized Process Cheese Made from Stirred Curd Cheese Obtained from the Curd of the Present Invention This example illustrates the use of stirred curd cheese made from a curd of the present invention in the manufacture of pasteurized process cheese.

A curd was obtained by the batch process of the present invention from skim milk. 223.75 grams of the curd were mechanically blended and worked with 7.5 grams of salt and 107 grams of anhydrous butterfat to produce a stirred curd cheese.

The stirred curd cheese was then mixed with 619.88 grams of comminuted American type cheese, 30 grams of a blend of sodium phosphate and sodium citrate emulsifiers, and 40 grams of a mixture of a coloring agent in water. The mixture was then heated to about 85–87.7° C. (185–190° F.) and blended at that temperature until a homogeneous plastic mass was formed. The hot plastic mass was formed into sheets and the standard L. D. Schreiber Test was conducted to determine its melt value. The melt value was 4 indicating a good quality process cheese. The cheese was also found to be organolepitcally acceptable.

D. Pasteurized Process Cheese Food

In the production of pasteurized process cheese food, the curd of the present invention can be introduced as stirred curd cheese and/or skim milk cheese for manufacturing. The former is introduced as a natural cheese ingredient; whereas the latter is introduced as an optional dairy ingredient.

A pasteurized process cheese food is prepared by comminuting and mixing, with the aid of heat, the stirred curd cheese of the present invention, alone or with one or more natural cheese varieties, with one or more of the optional dairy ingredients and one or more optional ingredients, into a homogeneous plastic mass. During its preparation, a pasteurized process cheese spread is heated for not less than 30 seconds at a temperature of not less than 65.6° C. (150° F.).

The optional dairy ingredients include: cream, milk, skim milk, buttermilk, cheese whey, any of the foregoing from which part of the water has been removed, anhydrous milkfat, dehydrated cream, albumin from cheese whey, skim milk cheese for manufacturing (which could be obtained by the process of the present invention), and others as permitted by law.

The optional ingredients include: an emulsifying agent, an acidifying agent, water, salt, harmless artificial coloring, spices or flavorings, antimycotics, anti-sticking agents, enzyme modified cheese, and others as permitted by law.

Suitable emulsifying agents include: monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, sodium potassium tartrate, and others as permitted by law. Generally the emulsifying agent or agents constitute not more than 3 percent by weight of the pasteurized process cheese spread.

Suitable acidifying agents include: vinegar, lactic acid, citric acid, acetic acid, and phosphoric acid. Generally the acidifying agents are added in such quantity that the pH of the pasteurized process cheese spread is not below 5.0.

The moisture content of a pasteurized process cheese food is more than 44 percent by weight, and the fat content is not less than 23 percent by weight.

The weight of the cheese ingredients constitute not less than 51 percent of the weight of the pasteurized process cheese spread.

E. EXample of Pasteurized Process Cheese Food Made of Skim Milk Cheese Obtained from the Curd of the Present Invention This example illustrates the use of the skim milk cheese made from a curd of the present invention in the manufacture of pasteurized process cheese food.

A skim milk cheese was made from a curd obtained by processing skim milk in accordance with the present invention. 15.29 pounds (6.94 kg) of comminuted American cheeses and 2.45 pounds (1.11 kg) of skim milk cheese produced by the present invention were thoroughly mixed and warmed in a Groen Kettle. 0.64 pounds (0.29 kg) of a blend of phosphate and citrate emulsifiers, 0.2 pounds (.09 kg) of salt, 2.48 pounds (1.13 kg) of diary powders, 0.08 pounds (0.036 kg) of citric acid, 0.03 pounds (0.014 kg) of sorbic acid, 1.25 pounds (0.568 kg) of plastic cream, 2.45 pounds (1.11 kg) of water, and a coloring agent were then added into the Groen Kettle. The content of the Groen Kettle was then mixed and heated to 85° C. (185° F). The temperature was maintained at 85° C. (185° F.) and the mixing continued until a homogeneous plastic mass was achieved.

The melt value of the resulting pasteurized process cheese food was then determined by the standard L.D. Schrieber Test. The melt value was found to be greater than 4, indicating a good quality process cheese food. The cheese was also found to be organoleptically acceptable.

F. Pasteurized Process Cheese Spread

The curd of the present invention converted to stirred curd cheese and/or skim milk cheese of manufacturing can be used in the conventional manufacturing process for making pasteurized process cheese spread. The stirred curd cheese is one of the varieties of natural cheeses permitted in the formulation and the skim milk cheese for manufacturing is one of the optional dairy ingredients permitted in the formulation.

A pasteurized process cheese spread is prepared by comminuting and mixing, with the aid of heat, the stirred curd cheese of the present invention, alone or with one or more natural cheese varieties, with an emulsifying agent, one or more optional dairy ingredients, and one or more optional ingredients, into a homogeneous plastic mass which is spreadable at 21.1° C. (70° F.). During its preparation, a pasteurized process cheese spread is heated for not less than 30 seconds at a temperature of not less than 65.6° C. (150° F.).

The optional dairy ingredients include: cream, milk, skim milk, buttermilk, cheese whey, any of the foregoing from which part of the water has been removed, anhydrous milkfat, dehydrated cream, albumin from cheese whey, skim milk cheese for manufacturing (which could be obtained by the process of the present invention) and others as permitted by law.

The optional ingredients include: an acidifying agent, water, salt harmless artificial coloring, sprices or flavorings, antimycotics, anti-sticking agents, and others as permitted by law.

Suitable emulsifying agents include: monosodium phosphate, disodium phosphate, dipotassium phosphate, trisodium phosphate, sodium methaphosphate (sodium hexametaphosphate), sodium acid pyrophosphate, tetrasodium pyrophosphate, sodium aluminum phosphate, sodium citrate, potassium citrate, calcium citrate, sodium tartrate, sodium potassium tartrate, and others as permitted by law. Generally the emulsifying agent or agents constitute not more than 3 percent by weight of the pasteurized process cheese spread. Suitable acidifying agents include: vinegar, lactic acid, citric acid, acetic acid, and phosphoric acid. Generally the acidifying agents are added in such quantity that the pH of the pasteurized process cheese spread is not below 4.0.

The moisture content of a pasteurized process cheese spread is more than 44 percent by weight but not more than 60 percent and the fat content is not less than 20 percent by weight.

The suitaable stabilizers include one or more of the following: carob bean gum, gum karaya, gum tragacanth, guar, gum, gelatin, sodium carboxymethylcellulose (cellulose gum), carrageenan, oat gum, algin (sodium alginate), propylene glycol alginate, or xanthan gum. The total weight of stabilizers should not be more than 0.8 percent by weight of the pasteurized process cheese spread. When one or more stabilizers are used, dioctyl sodium sulfosuccinate may be used in a quantity not in excess of 0.5 percent by weight of such ingredients.

The weight of the cheese ingredients constitutes not less than 51 percent by weight of the pasteurized process cheese spread.

G. Example of Pasteurized Process Cheese Spread Made of Skim Milk Cheese Obtained from the Curd of the Present Invention A skim milk cheese was made from a curd obtained by processing skim milk in accordance with the present invention. 12 pounds (5.45 kg) of comminuted American type cheeses and 3.3 pounds (1.50 kg) of the skim milk cheese were mixed in a Groen Kettle (manufactured by Groen Division of Dover Corporation). The mixture was warmed and the following ingredients were added thereto: 0.75 pounds (0.341 kg) of a blend of phosphate and citrate emulsifiers, 0.1 pounds (0.0454 kg) of citric acid, 0.2 pounds (0.091 kg) of salt, 0.04 pounds (0.0007 kg) of sorbic acid, 2.74 pounds (1.244 kg) of dairy powders, 1.40 pounds (0.636 kg) of plastic cream, 3.00 pounds of water and color. The content of the kettle was then thoroughly mixed and heated to 85° C. (185° F.). The mixing was continued and the temperature was maintained at 85° C. (185° F.) until a homogenous plastic mass was obtained.

The melt value of the resulting pasteurized process cheese spread was then determined by the standard L. D. Schrieber Test. The melt value was found to be greater than 4, indicating a good quality process cheese spread. The cheese was also found to be organoleptically acceptable.

H. Pasteurized Process Cheese Product

The formulation and manufacture of pasteurized process cheese product has not been specified by law in the United States; however, certain compositions and processing methods have been recognized by the industry to produce what is commonly called a pasteurized process cheese product. The following is the description of the composition and the method of manufacture of processed cheese which is generally called a pasteurized process cheese product in the United States.

The stirred curd cheese and/or the skim milk cheese for manufacturing made from the curd of the present invention can be used as ingredients in the process. The stirred curd cheese and/or the skim milk cheese for manufacturing is comminuted and mixed, with the aid of heat, with one or more optional cheese ingredients, one or more optional dairy ingredients, and one or more additional optional ingredients, into a homogeneous plastic mass. A pasteurized process cheese product is heated for not less than 30 seconds at a temperature of not less than 65.6° C. (150° F.).

The optional dairy ingredients include milk and milk derivatives, other than casein and caseinates. The additional optional ingredients include the following: emulsifying agents, stabilizers, acidifying agents, nutritive carbohydrate sweeteners, water, salt, color, spices, flavorings, antimycotics, anti-sticking agents, enzyme modified cheese, and cooked, canned or dried fruits, vegetables, fish and poultry.

Emulsifying agents (such as phosphates, citrates, carbonates, and tartrates) can be included in such quantity that the weight of the solids of such emulsifying agents is not more than 3 percent by weight of the finished food calculated as the anhydrous substance.

Stabilizers consisting of one or more of approved vegetable gums, gelatin, algin (sodium alginate), propylene glycol alginate, or xanthan gum can also be included. The total weight of such substances is not more than 0.8 percent by weight of the finished product. When one or more optional ingredients is used, dioctyl sodium sulfosuccinate may be used in a quantity not in excess of 0.5 percent of the weight of such ingredients.

Acidifying agents are used in such quantity that the pH of the pasteurized process cheese product is not below 4.0.

The moisture content of the resulting pasteurized process cheese product is not more than 60 percent by weight. The weight of the cheese ingredient constitutes not less than 51 percent by weight of the finished pasteurized process cheese product.

I. Example of Process Cheese Product Made from Skim Milk Cheese Obtained from A Curd of the Present Invention This example illustrates the use of the skim milk cheese made from a curd of this invention in the manufacture of process cheese product. 118 grams of the curd obtained by the process of this invention was mixed with 2.5 grams of salt and worked to form the skim milk cheese. The skim milk cheese was then placed in a stove top double boiler together with 5.1 grams of sodium citrate emulsifying agents and 0.13 grams sorbic acid. The content of the boiler was then mixed and heated to a temperature of about 71.1°-87.8° C. (160°-190° F.). The mixture was agitated and the temperature thereof was maintained at about 71.1°-87.8° C. (160°-190° F.) until a substantially homogeneous mass was achieved. 23 grams of American type cheese and 1.5 grams of flavoring agent were then added and mixed into the homogeneous mass. Once these ingredients were mixed and formed into a homogeneous mass, 11.2 grams of powdered milk and 11.2 grams of whey powder were added and mixed in. A small amount of calcium chloride was then added to make the plastic mass smoother. The plastic mass was then stirred vigorously to produce process cheese product.

The pH of the resulting process cheese product was 5.67. The melt value thereof was 4, as measured by the standard L. D. Schrieber Test, indicating excellent process cheese product. The taste and chewing characteristics of the process cheese product were also acceptable.

DESCRIPTION OF PROCESSES FOR MAKING IMITATION CHEESE

A. General Description

Generally, at the present time the protein component of commercial imitation cheeses is caseins, sodium caseinates, calcium caseinates, or mixtures thereof. The protein component is blended with emulsifying salts, lipid material, and, optionally, with flavorings, minerals, and vitamins. Appropriate fortification with micronutrients achieves nutritional equivalence to natural and processed cheeses. Lactic or other food grade acids are added to give the imitation cheese a pH of about 5.8-5.9. The lipid material can include vegetable and/or animal fat.

By proper balancing and sequential addition of these ingredients and direct steam injector cooking, an imitation cheese is produced with physical and functional properties similar to those of conventional natural and processed cheeses. The highly viscous nature of the mixtures during processing demands high shear agitation to properly integrate components, but the operation otherwise is one of simple blending.

Imitation cheeses can be made in the conventional manner from curds of the present invention instead of the traditional protein components, such as caseins and caseinates.

B. Example of Imitation Cheese Made from a Curd Obtained from Skim Milk in Accordance with the Present Invention This example illustrates the use of the curd of this invention obtained from skim milk in the manufacture of an imitation cheese.

A curd was obtained by the process of this invention using skim milk as the raw material. The curd contained 33 weight percent of solids. 659.3 grams of the curd, 33.8 grams of an emulsifying agent composed of trisodium phosphate and sodium citrate, 1.9 grams of sorbic acid, and 12 grams of salt were added to a steam cooker. The content of the cooker was then heated to 87.8° C. (190° F.) while it was being agitated. Small amounts of sodium hydroxide and calcium chloride were added to the agitated mixture to smooth the mixture and bring its pH value to about 5.7–5.8. 105.8 grams of a mixture of dried milk and whey powders was then added along with 9.4 grams of flavoring agents, and 1.0 grams of microcrystalline cellulose. Agitation was continued and the temperature maintained at 87.8° C. (190° F.) until a substantially homogeneous melted plastic mass was obtained. 164 grams of partially hydrogenated cottonseed oil, a colorant, and small amounts of acid and water were then added to bring the composition to the desired pH value of 5.7. The agitation and heating were continued until a smooth imitation cheese was obtained.

The imitation cheese had satisfactory taste and chewing characteristics.

C. Example of Imitation Cheese Made from a Curd Obtained from an Aqueous Medium Containing Skim Milk and Egg White Proteins This example illustrates the use of the curd of this invention, obtained from an aqueous medium containing skim milk and egg white proteins dissolved therein, for manufacturing an imitation cheese.

Skim milk (1750 grams) and egg white (250 grams having 10 weight percent of soluble proteins) were admixed at 10° C. (50° F.). The pH of the mixture was adjusted to 7.02. The mixture was then heated to a temperature of 85° C. (185° F.) and held at that temperature for 30 minutes. Thereafter, the composition was cooled to 4.4° C. (40° F.), acidified with concentrated hydrochloric acid to a pH value of 4.6, heated to a temperature of 48.9° C. (120° F.), and maintained at that temperature with agitation for 15 minutes to allow for completeness of precipitation.

A curd was recovered by filtraton in a commercial milk filter paper. The recovered curd had 24.4 weight percent solids. Addition of trichloroacetic acid to the filtrate resulted in no precipitate, thereby indicating that all of the protein originally present was recovered in the curd.

Cooking the recovered curd (70 grams) with melted; partially hydrogenated soy bean oil (30 grams), trisodium phosphate (1 gram) and sodium chloride (2 grams), with agitation and a pH adjustment to a value of 5.6 with an aqueous sodium hydroxide solution, resulted in a smooth, thermoplastic emulsion, thereby demonstrating the curd's suitability for making imitation cheese.

Many changes and modifications will occur to those skilled in the art upon studying this disclosure. All such changes and modifications that fall within the spirit of this invention are intended to be included within its scope.

We claim:

1. A process for recovering a curd of casein and soluble proteins from an aqueous medium comprising:
   (a) adjusting the pH of the aqueous medium to an alkaline pH of less than about 8.0; then
   (b) heating the aqueous medium to a temperature in the range of about 65.6° C. to 85.0° C.; and
   (c) holding the heated aqueous medium for a time period sufficient to permit the formation of casein-soluble protein complex; then
   (d) adjusting the temperature of the aqueous medium to the range of about 32.2° C. and 76.7° C.; and
   (e) adjusting the pH of the aqueous medium to the range of 4.2 to 5.5 to precipitate the casein-soluble protein complex in the aqueous medium; and then
   (f) separating the complex precipitate from the aqueous medium to recover a curd of casein and soluble proteins, said curd being useful as both the curd ingredient in the making of natural cheeses and as the natural cheese ingredient in the making of processed and imitation cheeses.

2. The process of claim 1 wherein the aqueous medium is milk.

3. The process of claim 2 further comprising admixing non-milk soluble proteins with the milk prior to step (a).

4. The process of claim 1 wherein the aqueous medium is cow's milk.

5. The process of claim 1 wherein the aqueous medium is whole milk.

6. The process of claim 1 wherein the aqueous medium is skim milk.

7. The process of claim 1 wherein step (f) is accomplished by centrifuging.

8. The process of claim 1 wherein: the pH in step (a) is adjusted to the range of about 7.2 to 7.5;
   the aqueous medium is heated in step (b) to a temperature in the range of about 71.1° C. to 79.4° C.;
   the time period in step (c) is in the range of about 15 to 60 minutes;
   the temperature of the aqueous medium is adjusted in step (d) to the range of about 48.9° C. to 65.6° C.; and
   the pH of the aqueous medium is adjusted in step (e) to the range of about 4.6 and 5.2.

9. The process of claim 2 wherein step (f) is accomplished by centrifuging.

10. The process of claim 3 wherein step (f) is accomplished by centrifuging.

11. The process of claim 4 wherein step (f) is accomplished by centrifuging.

12. The process of claim 5 wherein step (f) is accomplished by centrifuging.

13. The process of claim 6 wherein step (f) is accomplished by centrifuging.

14. The process of claim 8 wherein step (f) is accomplished by centrifuging.

15. The process of claim 8 wherein the heated aqueous medium is held in step (c) for a time period of about 15 minutes to 30 minutes and the aqueous medium is heated in step (b) to a temperature in the range of about 71.1° C. to 75.0° C.

16. The curd made in accordance with the process of claim 1.

17. The curd made in accordance with the process of claim 2.

18. The curd made in accordance with the process of claim 3.

19. The curd made in accordance with the process of claim 4.

20. The curd made in accordance with the process of claim 5.

21. The curd made in accordance with the process of claim 6.

22. The curd made in accordance with the process of claim 7.

23. The curd made in accordance with the process of claim 8.

24. The curd made in accordance with the process of claim 9.

25. The curd made in accordance with the process of claim 10.

26. The curd made in accordance with the process of claim 11.

27. The curd made in accordance with the process of claim 12.

28. The curd made in accordance with the process of claim 13.

29. The curd made in accordance with the process of claim 14.

30. The curd made in accordance with the process of claim 15.

31. A process for recovering a curd of casein and soluble proteins from skim milk comprising:
   (a) adjusting the pH of the skim milk to an alkaline pH of less than about 8.0; then
   (b) heating the skim milk to a temperature in the range of about 65.6° C. to 85.0° C.; and
   (c) holding the heated skim milk for a time period sufficient to permit the formation of casein-soluble protein complex; then
   (d) adjusting the temperature of the skim milk to the range of about 32.2° C. to 76.7° C.; and
   (e) adjusting the pH of the skim milk to the range of 4.2 to 5.5 to precipitate the casein-soluble protein complex in a whey; and then
   (f) separating the complex precipitate from the whey to recover a curd of casein and soluble protein, said curd being useful as both the curd ingredient in the making of natural cheeses and as the natural cheese ingredient in the making of processed and imitation cheeses.

32. The process of claim 31 wherein step (f) is accomplished by centrifuging.

33. The process of claim 31 wherein:
   the pH in step (a) is adjusted to the range of 7.2 to 7.5;
   the time period in step (c) is in the range of about 15 to 60 minutes;
   the skim milk is heated in step (b) to a temperature in the range of about 71.1° C. to 79.4° C.;
   the temperature of the skim milk in step (d) is adjusted to the range of about 48.9° C. to 65.6° C.; and
   the pH of the skim milk is adjusted to the range of 4.6 and 5.2.

34. The process of claim 33 wherein step (f) is accomplished by centrifuging.

35. The process of claim 34 wherein the skim milk is held in step (c) for a time period of about 15 minutes to 30 minutes and the skim milk is heated in step (b) to a temperature in the range of about 71.1° C. to 75.0° C.

36. The curd made in accordance with the process of claim 31.

37. The curd made in accordance with the process of claim 32.

38. The curd made in accordance with the process of claim 33.

39. The curd made in accordance with the process of claim 34.

40. The curd made in accordance with the process of claim 35.

41. A process for recovering a curd from cow's milk having casein and soluble proteins therein comprising:
   (a) admixing cow's milk with non-milk soluble proteins to form a solution; then
   (b) adjusting the pH of the solution to an alkaline pH of less than about 8.0; then
   (c) heating the solution to a temperature in the range of about 65.6° C. to 85.0° C.; and
   (d) holding the heated solution for a time period sufficient to permit the formation of casein-soluble protein complex; then
   (e) adjusting the temperature of the solution to the range of about 32.2° C. and 76.7° C.; and
   (f) adjusting the pH of the solution to the range of 4.2 to 5.5 to form a precipitate of the casein-soluble protein complex in a whey; and then
   (g) separating the complex precipitate to recover the curd from the whey, said curd being useful as both the curd ingredient in the making of natural cheeses and as the natural cheese ingredient in the making of processed and imitation cheeses.

42. The process of claim 41 wherein step (g) is accomplished by centrifuging, the soluble proteins are selected from the group consisting of egg white proteins and corn proteins; and the time period in step (d) is in the range of about 15 to 60 minutes.

43. The process of claim 41 wherein cow's milk is skim milk.

44. The process of claim 41 wherein: the pH in step (b) is adjusted to the range of about 7.2 to 7.5;
   the solution is heated in step (c) to a temperature in the range of about 71.1° C.–79.4° C.;
   the heated solution is held in step (d) for a time period in the range of about 15 to 60 minutes;
   the temperature of the solution is adjusted in step (e) to the range of about 48.9° C. to 65.6° C.;
   the pH of the solution is adjusted in step (f) to the range of 4.6 to 5.2; and
   step (g) is accomplished by centrifuging.

45. The process of claim 44 wherein the solution is heated in step (c) to a temperature in the range of about 71.1° C. to 75.0° C.

46. The curd made in accordance with the process of claim 41.

47. The curd made in accordance with the process of claim 42.

48. The curd made in accordance with the process of claim 43.

49. The curd made in accordance with the process of claim 44.

50. The curd made in accordance with the process of claim 45.

51. A process for treating an aqueous mixture of casein and soluble proteins, said process comprising:
(a) adjusting the pH of the aqueous mixture to an alkaline pH of less than about 8.0; then
(b) heating the aqueous mixture to a temperature in the range of about 65.6° C. to 85.0° C.; and
(c) holding the heated aqueous mixture for a time period sufficient to permit the formation of a casein-soluble protein complex.

52. The process of claim 51 wherein:
the pH in step (a) is adjusted to the range of about 7.2 to 7.5;
the aqueous medium is heated in step (b) to a temperature in the range of about 71.1° C. to 79.4° C.;
the time period in step (c) is in the range of about 15 to 60 minutes.

53. The process of claim 51 wherein the aqueous medium is milk.

54. The process of claim 51 wherein the aqueous medium is cow's milk.

55. The process of claim 51 wherein the aqueous medium is whole milk.

56. The process of claim 51 wherein the aqueous medium is skim milk.

57. The process of claim 51 wherein the aqueous medium is heated in step (b) to a temperature in the range of about 71.1° C. to 75.0° C.

58. The casein-soluble protein complex made in accordance with the process of claim 51.

59. The casein-soluble protein complex made in accordance with the process of claim 52.

60. The casein-soluble protein complex made in accordance with the process of claim 53.

61. The casein-soluble protein complex made in accordance with the process of claim 54.

62. The casein-soluble protein complex made in accordance with the process of claim 55.

63. The casein-soluble protein complex made in accordance with the process of claim 56.

64. The casein-soluble protein complex made in accordance with the process of claim 57.

65. A soluble casein-soluble protein complex comprising proteins having about the following molecular weights measured in Daltons by the Gainer method: 68,600; 62,900; 24,900; 23,500, 20,100; 19,000.

66. A casein-soluble protein complex precipitate comprising proteins having about the following molecular weights measured in Daltons by the Gainer method: 68,600; 62,900; 24,900; 23,500; 20,100; 19,000.

67. A curd of casein and soluble proteins comprising proteins having about the following molecular weights measured in Daltons by the Gainer method: 68,600; 62,900; 24,900; 23,500; 20,100; 19,000.

68. A curd comprising:
35-80 percent water by weight; and
65-20 percent solids by weight, said solid comprising:
23-69 percent by weight of casein-soluble protein complex precipitate having the following molecular weights measured in Daltons by the Gainer method: 68,600; 62,900; 24,900; 23,500; 19,000;
25-60 weight percent of butterfat;
3-9 weight percent of lactose; and
3-8 weight percent of minerals.

69. A curd comprising:
35-80 percent water by weight; and
65-20 percent solids by weight, said solids comprising:
83 to 94 percent by weight of casein-soluble protein complex precipitate having the following molecular weights measured in Daltons by the Gainer method: 68,600, 62,900; 24,900; 23,500; 20,100; 19,000;
3 to 9 weight percent of lactose; and
3 to 8 weight percent of minerals.

70. A curd comprising:
50 to 80 percent water by weight; and
50 to 20 percent solids by weight, said solids comprising:
83 to 94 percent by weight of casein-soluble protein complex precipitate having about the following molecular weights measured in Daltons by the Gainer method: 68,600, 62,900; 24,900; 23,500; 20,100; 19,000;
3 to 9 weight percent of lactose; and
3 to 8 weight percent of minerals.

71. A curd comprising:
50 to 80 percent of water by weight; and
50 to 20 percent solids by weight, said solids comprising:
38-94 percent by weight of casein-soluble protein complex precipitate having about the following molecular weights measured in Daltons by the Gainer method: 68,600; 62,900; 24,900; 23,500; 20,100; 19,000;
0-55 weight percent of butterfat;
3-9 weight percent of lactose; and
3-8 weight percent of minerals.

72. A food product comprising casein-soluble protein complex precipitate admixed with other ingredients, said precipitate comprising proteins having about the following molecular weights as measured in Daltons by the Gainer method: 68,600; 62,900; 24,900; 23,500; 20,100, 19,000.

73. The food product of claim 72 wherein its melt value is at least 4.

74. A processed cheese comprising casein-soluble protein complex precipitate admixed with other ingredients, said precipitate comprising proteins having about the following molecular weights as measured in Daltons by the Gainer method: 68,600; 62,900; 24,900; 23,500; 20,100; 19,000.

75. The processed cheese of claim 74 wherein its melt value is at least 4.

76. A process cheese comprising casein-soluble protein complex precipitate admixed with other ingredients, said precipitate comprising proteins having about the following molecular weights as measured in Daltons by the Gainer method: 68,600; 62,900; 24,900; 23,500; 20,100; 19,000.

77. The process cheese of claim 76 wherein its melt value is at least 4.

78. The process cheese of claim 76 wherein said casein-soluble protein complex precipitate is in an admixture with moisture, lactose, minerals, butterfat, and an emulsifying agent.

79. A process cheese food comprising casein-soluble protein complex precipitate admixed with other ingredients, said precipitate comprising proteins having about the following molecular weights as measured in Daltons by the Gainer method: 68,600; 62,900; 24,900; 23,500; 20,100; 19,000.

80. The process cheese food of claim 79 wherein its melt value is at least 4.

81. The process cheese food of claim 80 wherein the casein-soluble protein complex precipitate is in a homogeneous mass comprising: moisture, lactose, minerals, butterfat, an emulsifying agent, and optional dairy ingredients.

82. A process cheese spread comprising casein-soluble protein complex precipitate admixed with other ingredients, said precipitate comprising proteins having about the following molecular weights as measured in Daltons by the Gainer method: 68,600; 62,900; 24,900; 23,500; 20,100; 19,000.

83. The process cheese spread of claim 82 wherein the casein-soluble protein complex precipitate is in a homogeneous mass comprising: moisture, lactose, minerals, butterfat, and an emulsifying agent.

84. The process cheese spread of claim 82 wherein its melt value is at least 4.

85. A process cheese product comprising casein-soluble protein complex precipitate admixed with other ingredients, said precipitate comprising proteins having about the following molecular weights as measured in Daltons by the Gainer method: 68,600; 62,900; 24,900; 23,500; 20,100; 19,000.

86. The process cheese product of claim 85 wherein its melt value is at least 4.

87. An imitation cheese comprising casein-soluble protein complex precipitate admixed with other ingredients, said precipitate comprising proteins having the following molecular weights as measured in Daltons by the Gainer method: 68,600; 62,900; 24,900; 23,500; 20,100; 19,000.

88. The imitation cheese of claim 87 wherein its melt value is at least 4.

89. A process for making processed cheese from a curd of casein and soluble proteins recovered from an aqueous medium comprising:
 (a) adjusting the pH of the aqueous medium to an alkaline pH of less than about 8.0; then
 (b) heating the aqueous medium to a temperature in the range of about 65.6° C. to 85.0° C.; and
 (c) holding the heated aqueous medium for a time period sufficient to permit the formation of casein-soluble protein complex; then
 (d) adjusting the temperature of the aqueous medium to the range of about 32.2° C. and 76.7° C.; and
 (e) adjusting the pH of the aqueous medium to the range of 4.2 to 5.5 to precipitate the casein-soluble protein complex in the aqeuous medium; then
 (f) separating the complex precipitate from the aqueous medium to recover a curd of casein and soluble proteins; and
 (g) admixing said curd with other ingredients of processed cheese to produce processed cheese.

90. A processed cheese made in accordance with the process of claim 89.

91. A process for making process cheese from a curd of casein and soluble proteins recovered from an aqueous medium comprising:
 (a) adjusting the pH of the aqueous medium to an alkaline pH of less than about 8.0; then
 (b) heating the aqueous medium to a temperature in the range of about 65.6° C. to 85.0° C.; and
 (c) holding the heated aqueous medium for a time period sufficient to permit the formation of casein-soluble protein complex; then
 (d) adjusting the temperature of the aqueous medium to the range of about 32.2° C. and 76.7° C.; and
 (e) adjusting the pH of the aqueous medium to the range of 4.2 to 5.5 to precipitate the casein-soluble protein complex in the aqueous medium; then
 (f) separating the complex precipitate from the aqeuous medium to recover a curd of casein and soluble proteins; and
 (g) admixing said curd with other ingredients of process cheese to produce process cheese.

92. A process cheese made in accordance with the process of claim 91.

93. A process for making natural cheese from a curd of casein and soluble proteins recovered from an aqueous medium comprising:
 (a) adjusting the pH of the aqueous medium to an alkaline pH of less than about 8.0; then
 (b) heating the aqueous medium to a temperature in the range of about 65.6° C. to 85.0° C.; and
 (c) holding the heated aqueous medium for a time period sufficient to permit the formation of casein-soluble protein complex; then
 (d) adjusting the temperature of the aqueous medium to the range of about 32.2° C. and 76.7° C.; and
 (e) adjusting the pH of the aqueous medium to the range of 4.2 to 5.5 to precipitate the casein-soluble protein complex in the aqeuous medium; then
 (f) separating the complex precipitate from the aqueous medium to recover a curd of casein and soluble proteins; and
 (g) admixing said curd with other ingredients of natural cheese to produce natural cheese.

94. A natural cheese made in accordance with the process of claim 93.

95. A process for making processed cheese from a curd of casein and soluble proteins recoverd from skim milk comprising:
 (a) adjusting the pH of the skim milk to an alkaline pH of less than about 8.0; then
 (b) heating the skim milk to a temperature in the range of about 65.6° C. to 85.0° C.; and
 (c) holding the heated skim milk for a time period sufficient to permit the formation of casein-soluble protein complex; then
 (d) adjusting the temperature of the skim milk to the range of about 32.2° C. to 76.7° C.; and
 (e) adjusting the pH of the skim milk to the range of 4.2 to 5.5 to precipitate the casein-soluble protein complex in a whey; then
 (f) separating the complex precipitate from the whey to recover a curd of casein and soluble protein; and
 (g) admixing said curd with other ingredients of processed cheese to produce processed cheese.

96. A processed cheese made in accordance with the process of claim 95.

97. A process for making process cheese from a curd of casein and soluble proteins recovered from skim milk comprising:
 (a) adjusting the pH of the skim milk to an alkaline pH of less than about 8.0; then
 (b) heating the skim milk to a temperature in the range of about 65.6° C. to 85.0° C.; and
 (c) holding the heated skim milk for a time period sufficient to permit the formation of casein-soluble protein complex; then
 (d) adjusting the temperature of the skim milk to the range of about 32.2° C. to 76.7° C.; and
 (e) adjusting the pH of the skim milk to the range of ;4.2 to 5.5 to precipitate the casein-soluble protein complex in a whey; then (f) separating the complex precipitate form the whey to recover a curd of casein and soluble protein; and (g) admixing said curd with other ingredients of process cheese to produce process cheese.

98. A process cheese made in accordance with the process of claim 97.

99. A process for making natural cheese from a curd of casein and soluble proteins recovered from skim milk comprising:

(a) adjusting the pH of the skim milk to an alkaline pH of less than about 8.0; then (b) heating the skim milk to a temperature in the range of about 65.6° C. to 85.0° C.; and (c) holding the heated skim milk for a time period sufficient to permit the formation of casein-soluble protein complex; then (d) adjusting the temperature of the skim milk to the range of about 32.2° C. to 76.7° C.; and (e) adjusting the pH of the skim milk to the range of 4.2 to 5.5 to precipitate the casein-soluble protein complex in a whey; then (f) separating the complex precipitate from the whey to recover a curd of casein and soluble protein; and (g) admixing said curd with other ingredients of natural cheese to produce natural cheese.

100. A natural cheese made in accordance with the process of claim 99.

101. A process for making processed cheese from a curd recovered from cow's milk having casein and soluble proteins therein comprising:

(a) admixing cow's milk with non-milk soluble proteins to form a solution; then (b) adjusting the pH of the solution to an alkaline pH of less than about 8.0; then (c) heating the solution to a temperature in the range of about 65.6° C. to 85.0° C.; and (d) holding the heated solution for a time period sufficient to permit the formation of casein-soluble protein complex; then (e) adjusting the temperature of the solution to the range of about 32.2° C. and 76.7° C.; and (f) adjusting the pH of the solution to the range of 4.2 to 5.5 to form a precipitate of the casein-soluble protein complex in a whey; then (g) separating the complex precipitate to recover the curd from the whey; and (h) admixing said curd with other ingredients of processed cheese to produce processed cheese.

102. A processed cheese made in accordance with the process of claim 101.

103. A process for making process cheese from a curd recoverd from cow's milk having casein and soluble proteins therein comprising:

(a) admixing cow's milk with non-milk soluble proteins to form a solution; then (b) adjusting the pH of the solution to an alkaline pH of less than about 8.0; then (c) heating the solution to a temperature in the range of about 65.6° C. to 85.0° C.; and (d) holding the heated solution for a time period sufficient to permit the formation of casein-soluble protein complex; then (e) adjusting the temperature of the solution to the range of about 32.2° C. and 76.7° C.; and (f) adjusting the pH of the solution to the range of 4.2 to 5.5 to form a precipitate of the casein-soluble protein complex in a whey; then (g) separating the complex precipitate to recover the curd from the whey; and (h) admixing said curd with other ingredients of process cheese to produce process cheese.

104. A process made in accordance with the process of claim 103.

105. A process for making natural cheese from a curd recovered from cow's milk having casein and soluble proteins therein comprising:

(a) admixing cow's milk with non-milk soluble proteins to form a solution; then (b) adjusting the pH of the solution to an alkaline pH of less than about 8.0; then (c) heating the solution to a temperature in the range of about 65.6° C. to 85.0° C.; and (d) holding the heated solution for a time period sufficient to permit the formation of casein-soluble protein complex; then (e) adjusting the temperature of the solution to the range of about 32.2° C. and 76.7° C.; and (f) adjusting the pH of the solution to the range of 4.2 to 5.5 to form a precipitate of the casein-soluble protein complex in a whey; then (g) separating the complex precipitate to recover the curd from the whey; and (h) admixing the curd with other ingredients of natural cheese to produce natural cheese.

106. A natural cheese made in accordance with the process of claim 105.

107. A process for the preparation of a precipitate of casein and whey protein from a milk product containing casein and whey protein, which comprises:

(a) adjusting the pH of said milk product to a value in the range of from 7.0 to 7.5;

(b) heating the product obtained in step (a) at a temperature in the range of about 65.6° C. to 85° C. for a time sufficient to form a casein-whey protein complex;

(c) cooling the product obtained in step (b) to a temperature in the range of about 32.2° C. to 76.7° C.;

(d) reducing the pH of the cooled solution to a value in the range of 4.2 to 5.5; and (e) isolating the resulting precipitate.

108. The process of claim 107, wherein in step (a) the ph is adjusted with an alkaline compound.

109. The process of claim 108, wherein as an alkaline compound sodium hydroxide is used.

* * * * *